(12) United States Patent
Szyszkowski et al.

(10) Patent No.: US 12,351,392 B2
(45) Date of Patent: Jul. 8, 2025

(54) ARTICLE MANAGEMENT SYSTEM, LOGISTICS SYSTEM, SERVER DEVICE, AND ARTICLE MANAGEMENT METHOD

(71) Applicant: ROMS Inc, Tokyo (JP)

(72) Inventors: Grzegorz Szyszkowski, Pomeranian (PL); Lukasz Dawid Drewnowski, Lesser Poland (PL); Yosuke Maeno, Tokyo (JP); Jumpei Shimizu, Tokyo (JP)

(73) Assignee: ROMS Inc, Tokyo (JP)

( * ) Notice: Subject to any disclaimer, the term of this patent is extended or adjusted under 35 U.S.C. 154(b) by 739 days.

(21) Appl. No.: 17/597,579

(22) PCT Filed: Jul. 9, 2020

(86) PCT No.: PCT/JP2020/026933
§ 371 (c)(1),
(2) Date: Jan. 12, 2022

(87) PCT Pub. No.: WO2021/010298
PCT Pub. Date: Jan. 21, 2021

(65) Prior Publication Data
US 2022/0234831 A1    Jul. 28, 2022

(30) Foreign Application Priority Data
Jul. 12, 2019    (JP) ................................ 2019-130474

(51) Int. Cl.
*B65G 1/137* (2006.01)
(52) U.S. Cl.
CPC ................................ *B65G 1/1375* (2013.01)

(58) Field of Classification Search
CPC .................................................. B65G 1/1375
See application file for complete search history.

(56) References Cited

U.S. PATENT DOCUMENTS

| 11,927,472 B1* | 3/2024 | DesJardien .......... G01G 23/007 |
| 2016/0129587 A1* | 5/2016 | Lindbo .................. B25J 9/0096 |
| | | 700/218 |

(Continued)

FOREIGN PATENT DOCUMENTS

| CN | 107392687 A | 11/2017 |
| CN | 109359759 A | 2/2019 |

(Continued)

OTHER PUBLICATIONS

Jul. 7, 2023, the Extended European Search Report issued by the European Patent Office in the corresponding European Patent Application No. 20840396.4.

(Continued)

*Primary Examiner* — Kyle O Logan
(74) *Attorney, Agent, or Firm* — KENJA IP LAW PC

(57) ABSTRACT

An article management system includes an automated storage and retrieval system configured to store a plurality of containers, each container containing one or more articles, and take out, to a picking area adjacent to a pick-up area, a container containing at least one article to be picked up at the pick-up area, among the plurality of containers, and a control apparatus configured to control or support picking, at the picking area, the at least one article out of the container taken out by the automated storage and retrieval system.

17 Claims, 20 Drawing Sheets

(56) References Cited

U.S. PATENT DOCUMENTS

| | | | |
|---|---|---|---|
| 2018/0134492 A1* | 5/2018 | Lert, Jr. | G06Q 30/0633 |
| 2018/0137454 A1* | 5/2018 | Kulkarni | G05D 1/102 |
| 2018/0374144 A1* | 12/2018 | Smilowitz | B25J 9/0093 |
| 2019/0114564 A1* | 4/2019 | Ferguson | G06Q 10/06315 |
| 2019/0295244 A1* | 9/2019 | Adachi | G06F 18/214 |
| 2020/0202284 A1* | 6/2020 | Singh | G05D 1/101 |

FOREIGN PATENT DOCUMENTS

| | | |
|---|---|---|
| JP | H0532307 U | 4/1993 |
| JP | 2016103094 A | 6/2016 |
| JP | 2018145004 A | 9/2018 |
| JP | 2018151923 A | 9/2018 |
| WO | 2018068024 A1 | 4/2018 |
| WO | 2018094286 A1 | 5/2018 |
| WO | 2018116589 A1 | 6/2018 |

OTHER PUBLICATIONS

Sep. 29, 2020, International Search Report issued in the International Patent Application No. PCT/JP2020/026933.

Jan. 18, 2022, International Preliminary Report on Patentability issued in the International Patent Application No. PCT/JP2020/026933.

Jan. 26, 2023, Office Action issued by the Intellectual Property Office of Singapore in the corresponding Singaporean Patent Application No. 11202200312W.

Liu Changqi et al., Warehouse system facilities and equipment Selection and design, Sep. 2010, pp. 64-65, first edition.

Nov. 8, 2024, Office Action issued by the China National Intellectual Property Administration in the corresponding Chinese Patent Application No. 202080050773.4.

May 13, 2025, Office Action issued by the China National Intellectual Property Administration in the corresponding Chinese Patent Application No. 202080050773.4.

* cited by examiner

ARTICLE MANAGEMENT SYSTEM, LOGISTICS SYSTEM, SERVER DEVICE, AND ARTICLE MANAGEMENT METHOD

CROSS-REFERENCE TO RELATED APPLICATION

This application claims priority to Japanese Patent Application No. 2019-130474, filed on Jul. 12, 2019, the entire contents of which are incorporated herein by reference.

TECHNICAL FIELD

The present disclosure relates to an article management system, a logistics system, a server device, and an article management method.

BACKGROUND

Patent Literature (PTL) 1 teaches a technique in which a working robot performs an inspection process to check products delivered to a store against order information, and displays the delivered products on store shelves.

CITATION LIST

Patent Literature

PTL 1: JP 2018-151923 A

SUMMARY

Technical Problem

In a conventional store, a customer who purchases a product takes the product off a store shelf by hand, and brings it to a register. Thus, a wide aisle for a person to walk through shall be provided around the store shelves, and the height of the store shelves shall be such that the person can reach the top shelf. Therefore, the number of displayable products depending on the store footprint, namely, the article number density per footprint is limited.

An object of the present disclosure is to increase the article number density per footprint.

Solution to Problem

An article management system according to an embodiment of the present disclosure includes:
  an automated storage and retrieval system configured to store a plurality of containers, each container containing one or more articles, and take out, to a picking area adjacent to a pick-up area, a container containing at least one article to be picked up at the pick-up area, among the plurality of containers; and
  a control apparatus configured to control or support picking, at the picking area, the at least one article out of the container taken out by the automated storage and retrieval system.

A server device according to an embodiment of the present disclosure is to be connected with an article management system including:
  an automated storage and retrieval system configured to store a plurality of containers, each container containing one or more articles, and take out, to a picking area adjacent to a pick-up area, a container containing at least one article to be picked up at the pick-up area, among the plurality of containers; and
  a control apparatus configured to control or support picking, at the picking area, the at least one article out of the container taken out by the automated storage and retrieval system.

The server device includes:
  a communication interface configured to communicate with a user's terminal device; and
  a controller configured to accept a designation or a pre-order for the at least one article via the communication interface, select, from among a plurality of locations, a location where the container containing the at least one article is stored in the automated storage and retrieval system, with reference to inventory information for the article management system, which is installed in each location of the plurality of locations, and inform the terminal device of the selected location via the communication interface.

An article management method according to an embodiment of the present disclosure includes:
  by an automated storage and retrieval system configured to store a plurality of containers, each container containing one or more articles, taking out, to a picking area adjacent to a pick-up area, a container containing at least one article to be picked up at the pick-up area, among the plurality of containers; and
  by a control apparatus, controlling or supporting picking, at the picking area, the at least one article out of the container taken out by the automated storage and retrieval system.

Advantageous Effect

According to the present disclosure, the article number density per footprint can be increased.

BRIEF DESCRIPTION OF THE DRAWINGS

In the accompanying drawings.

DETAILED DESCRIPTION

Figure 1:
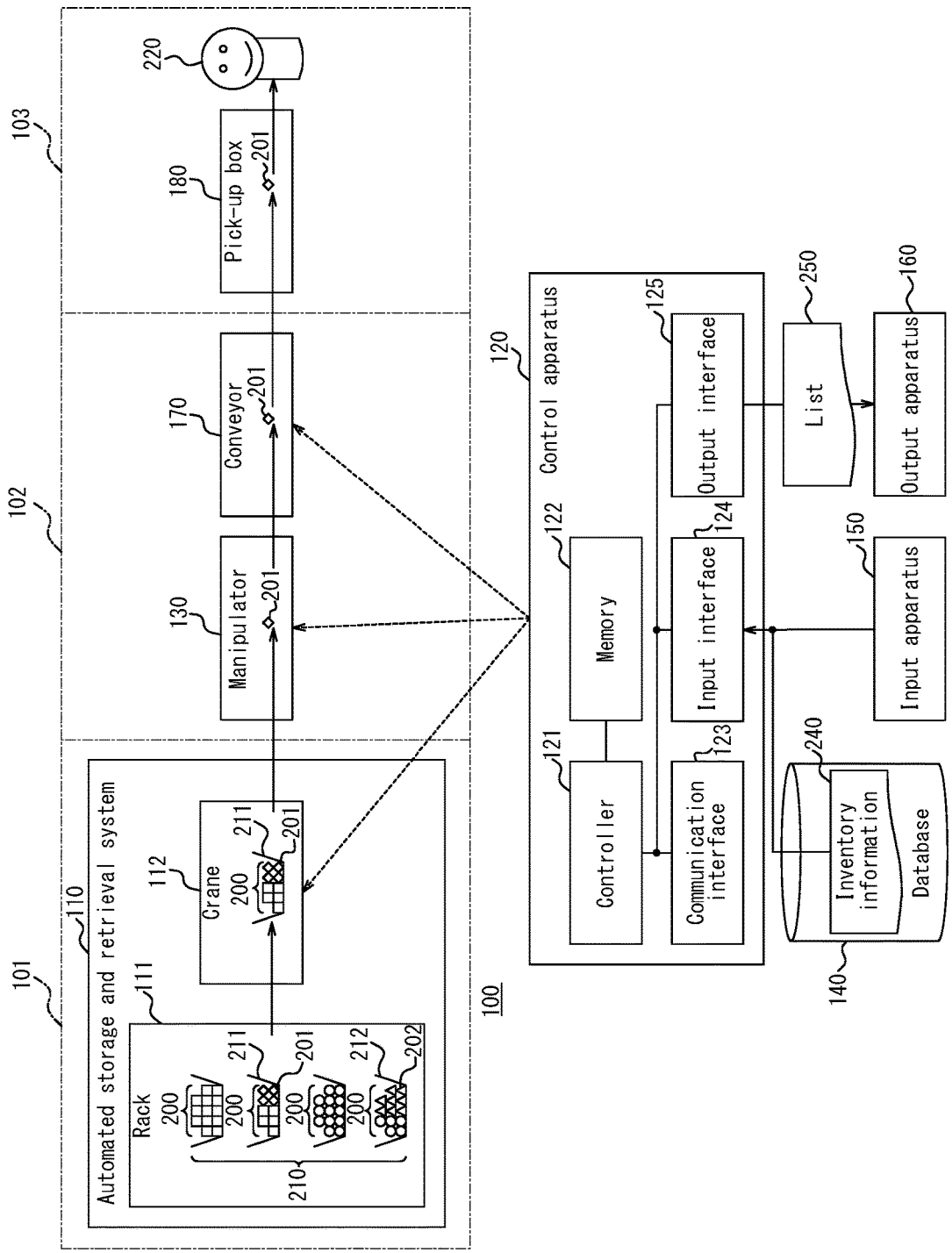
FIG. 1 is a block diagram illustrating a configuration of an article management system according to a first embodiment.

Hereinafter, embodiments of the present disclosure will be described with reference to the drawings.

In the drawings, the same or corresponding portions are denoted by the same reference numerals. In the descriptions of the embodiments, detailed descriptions of the same or corresponding portions are omitted or simplified as appropriate.

First Embodiment

Figure 2:
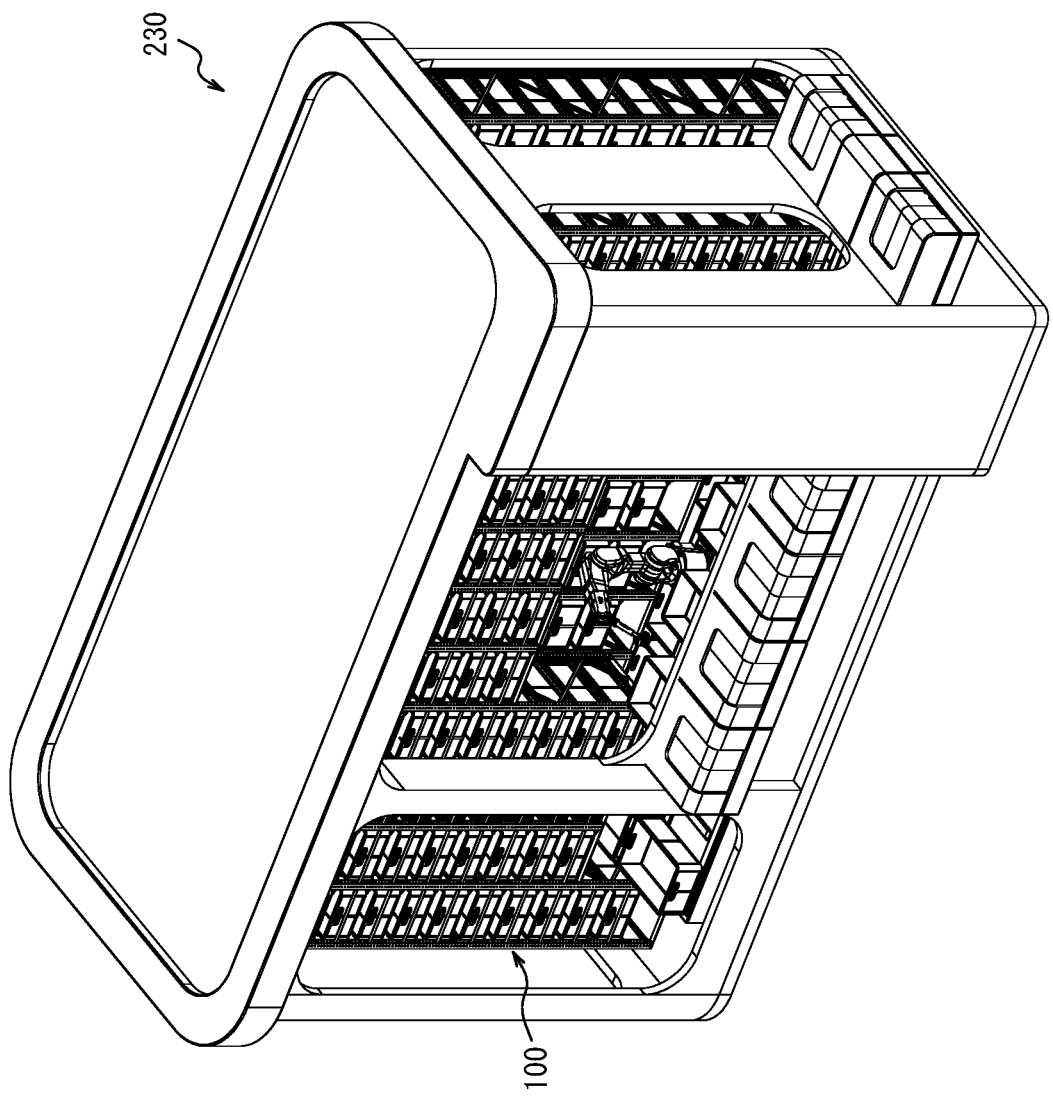
FIG. 2 is a perspective view of a store where the article management system according to the first embodiment is installed.
Figure 3:
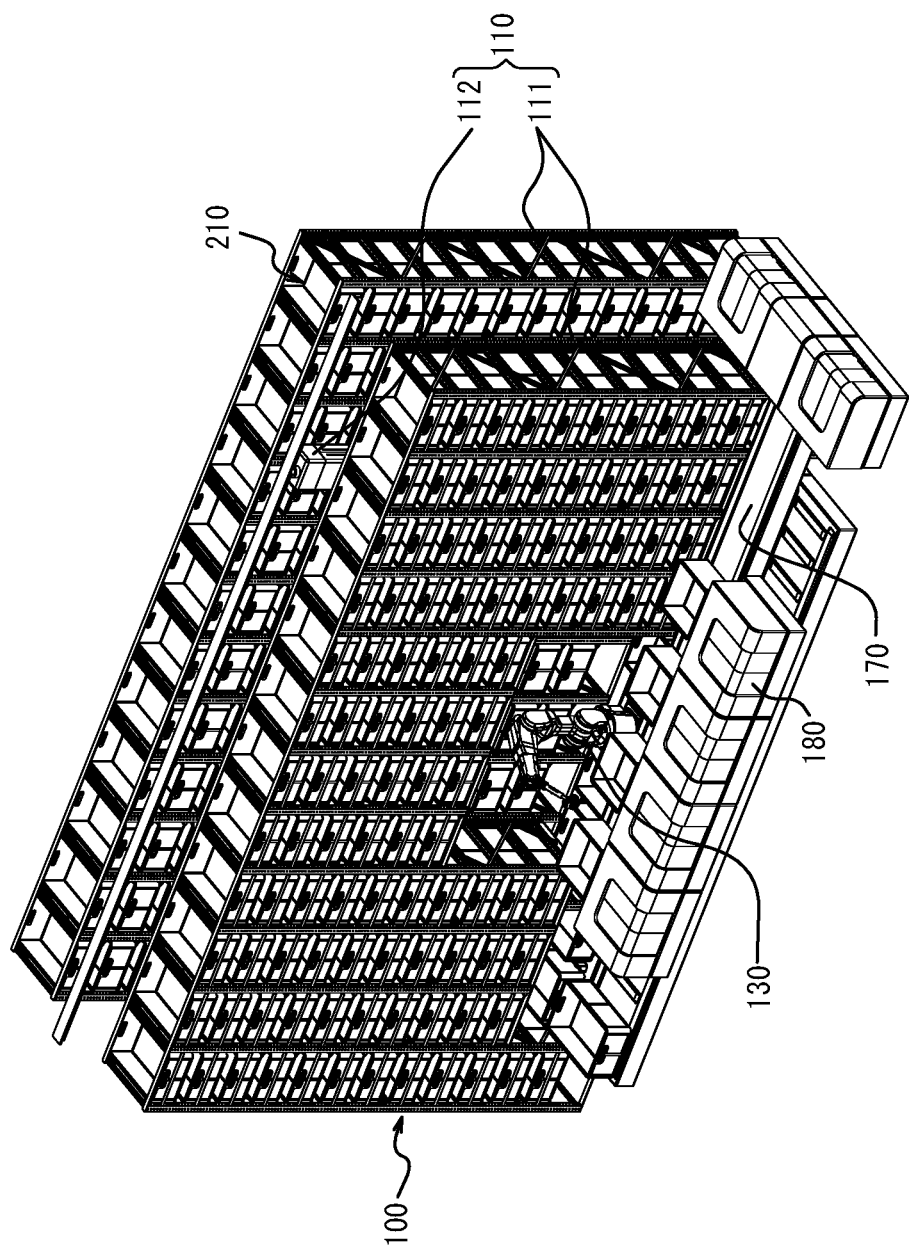
FIG. 3 is a perspective view of the article management system according to the first embodiment.

An outline of the present embodiment will be described with reference to FIGS. 1, 2, and 3.

In an article management system 100 according to the present embodiment, an automated storage and retrieval system 110 stores a plurality of containers 210, each container 210 containing one or more articles 200. The automated storage and retrieval system 110 takes out, to a picking area 102 adjacent to a pick-up area 103, a container 211 containing at least one article 201 to be picked up at the pick-up area 103, among the plurality of containers 210. A control apparatus 120 controls picking, at the picking area 102, the at least one article 201 out of the container 211 taken out by the automated storage and retrieval system 110.

In the present embodiment, instead of a user 220, who is to pick up the article 201 at the pick-up area 103, taking the article 201 from a corresponding storage position by hand, the automated storage and retrieval system 110 automatically retrieves the container 211 containing the article 201 from the storage position. Thus, the space around the storage position may be so narrow that a person cannot walk therethrough, and the height of the storage position may be so high that the person cannot reach. Therefore, the number of storable articles depending on the footprint of the location where the article management system 100 is installed, namely, the article number density per footprint can be increased.

The article management system 100 may be installed in any location where the user 220 can pick up the article 201. In the present embodiment, the article management system 100 is installed in a retailer's store 230 such as a convenience store or a supermarket. As a variation of the present embodiment, the article management system 100 may be installed in any one facility of a petrol station, a railway station, a compound, an office building, and an apartment building. As another variation of the present embodiment, the article management system 100 may be installed on a street. As yet another variation of the present embodiment, the article management system 100 may be transported on the back of a vehicle such as a truck or an automated vehicle, and operated as a mobile store. As yet another variation of the present embodiment, the article management system 100 may be installed in a base store that acts as a micro DC. The term "DC" is an abbreviation of distribution center. The base store holds products prior to replenishing a plurality of satellite stores. Each satellite store is, for example, a self-checkout unmanned store. Each satellite store is installed, for example, in an apartment or an office building. Customers at each satellite store read a unique two-dimensional code for each satellite store with mobile devices such as smartphones, thereby allowing a payment system to recognize which store the customers are about to shop at. When a customer purchases a product, the customer pays for the product by scanning a barcode of the product with a mobile device and making an online payment.

Each article 200 is a product for sale at the store 230, in the present embodiment. The types of the articles 200 include, for example, foods, commodities, and magazines. In addition to these, the types of the articles 200 may include various types. Alternatively, the types of the articles 200 may include only one or two types. The types of the articles 200 are distinguished as SKUs in the present embodiment. The term "SKU" is an abbreviation of stock keeping unit. The article 201 picked up by the user 220 is a product purchased by the user 220, in the present embodiment.

Each container 210 is a tote in the present embodiment. Alternatively, each container 210 may be, for example, a carton, a bag, a box, a pallet, a case, or a bucket.

In the present embodiment, a manipulator 130 performs the picking. Thus, the control apparatus 120 controls the picking by the manipulator 130. As a method for controlling the picking, any method may be used. One possible method in the present embodiment includes inputting, to the manipulator 130, identification information such as a barcode, a two-dimensional code, or an RFID attached to the article 201, or an image of the article 201, thereby causing the manipulator 130 to identify the article 201 and pick the article 201 out of the container 211. The term "RFID" is an abbreviation of radio-frequency identification.

In the present embodiment, not only the automated storage and retrieval system 110 automatically retrieves the container 211 containing the article 201 from the storage position, but also the manipulator 130 automatically picks the article 201 out of the container 211 retrieved by the automated storage and retrieval system 110. Thus, the user 220 does not need to pick the article 201 out of the container 211 by hand; therefore the convenience is improved. Alternatively, a clerk does not need to pick the article 201 out of the container 211 by hand; therefore the shortage of personnel in the store 230 can be overcome.

As a variation of the present embodiment, a person such as the user 220 or the clerk, instead of the manipulator 130, may pick by hand the article 201 out of the container 211 retrieved by the automated storage and retrieval system 110. In that case, the control apparatus 120 supports the picking by the person. As a method for supporting the picking, any method may be used. One possible method in this variation includes inputting, to a reader, identification information such as a barcode, a two-dimensional code, or an RFID attached to the article 201, thereby causing the person to identify the article 201 using the reader and pick the article 201 out of the container 211. Another possible method includes displaying an image of the article 201 on a display, thereby causing the person to identify the article 201 visually and pick the article 201 out of the container 211.

Figure 4:
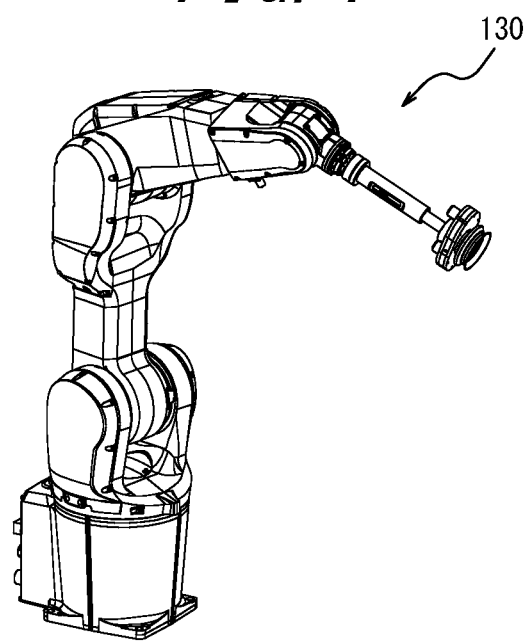
FIG. 4 is a perspective view of a manipulator of the article management system according to the first embodiment.
Figure 5:
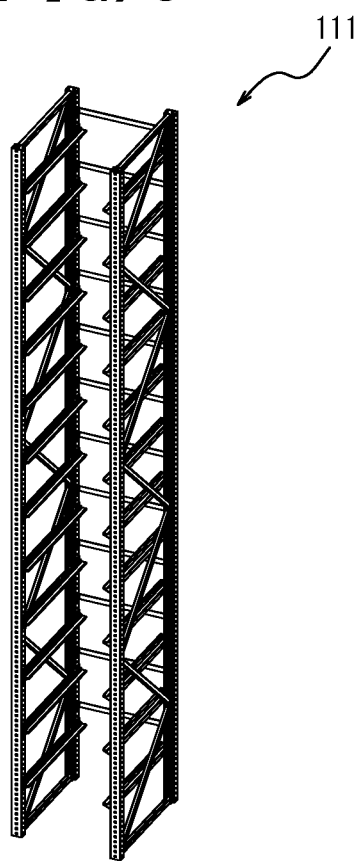
FIG. 5 is a perspective view of a rack of the article management system according to the first embodiment.
Figure 6:
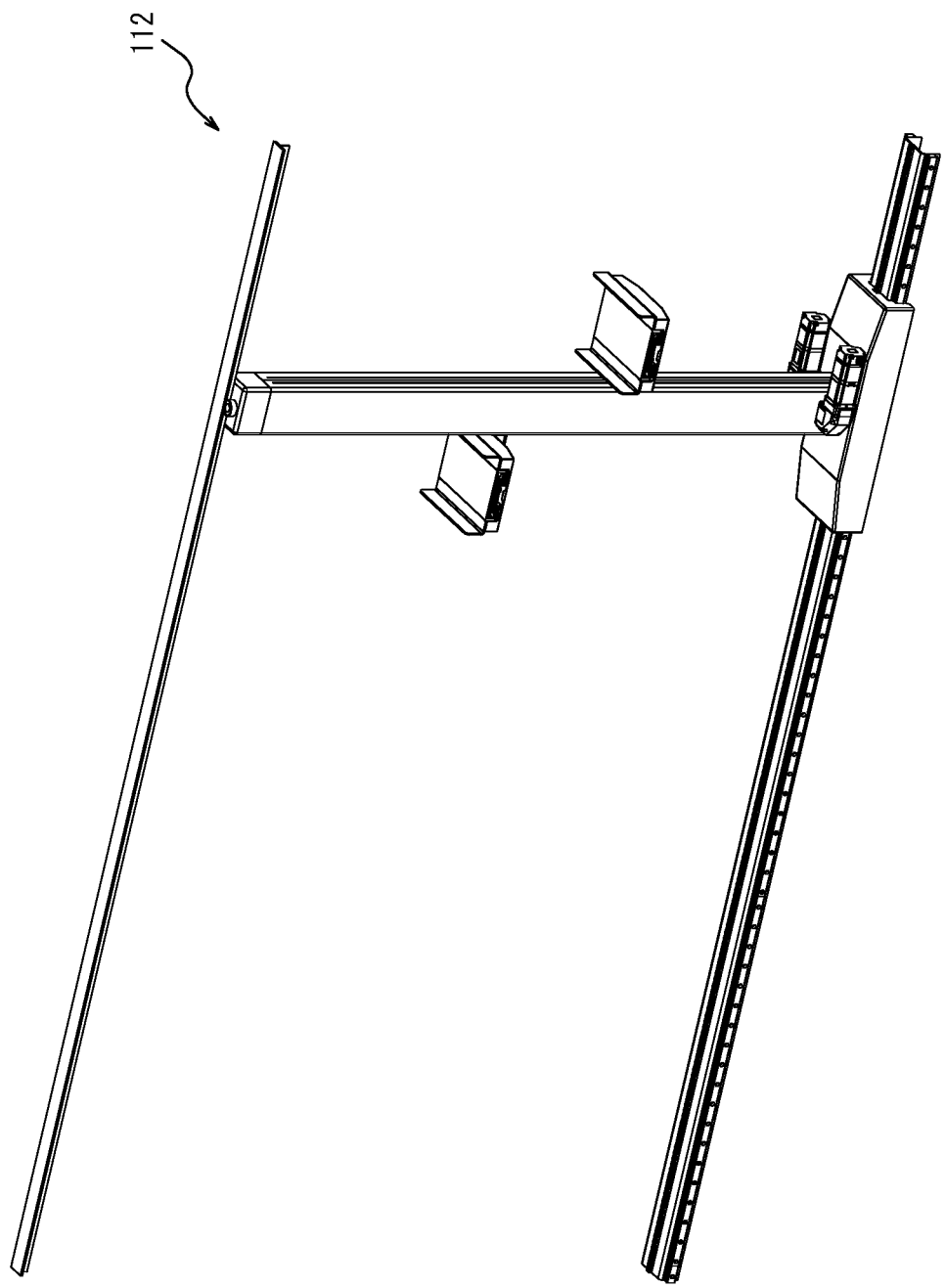
FIG. 6 is a perspective view of a crane of the article management system according to the first embodiment.

A configuration of the article management system 100 according to the present embodiment will be described with reference to FIGS. 4, 5, and 6 in addition to FIGS. 1 to 3.

In addition to the automated storage and retrieval system 110, the control apparatus 120, and the manipulator 130, the article management system 100 includes a database 140, an input apparatus 150, an output apparatus 160, a conveyor 170, and a pick-up box 180.

The automated storage and retrieval system 110 is installed in a storage area 101, which is for storage of the articles 200. The storage area 101 is adjacent to the picking area 102, which is for picking of the article 201. The picking area 102 is adjacent to the pick-up area 103, which is for pick-up of the article 201. The automated storage and retrieval system 110 is also referred to as the "AS/RS". The automated storage and retrieval system 110 is a crane type AS/RS in the present embodiment. Alternatively, the automated storage and retrieval system 110 may be, for example, a rotary shelf type, shuttle type, or bot type AS/RS.

The plurality of containers 210, each container 210 containing one or more articles 200, is brought into the automated storage and retrieval system 110. The automated storage and retrieval system 110 stores the plurality of containers 210 brought in.

Only one type of articles 200 may be contained in each container 210. Alternatively, two or more types of articles 200 may be contained in each container 210. In a case in which two or more types of articles 200 are contained in the same container 210, the two or more types of articles 200 may be sorted according to the types of the respective articles 200. As a sorting method, any method may be used. One possible method in the present embodiment includes dividing the inside of the container 210 into a plurality of spaces by one or more dividers, and putting each article 200 into a space for a corresponding type. The sorting operation may be performed before each container 210 is delivered to the store 230. Alternatively, the sorting operation may be performed after each container 210 is delivered to the store 230 and before each container 210 is brought into the automated storage and retrieval system 110, or may be performed inside the store 230, using the manipulator 130.

The control apparatus 120 is installed in the storage area 101, the picking area 102, the pick-up area 103, or another area. The control apparatus 120 is a computer.

The manipulator 130 is installed in the picking area 102. The number of manipulators 130 may be any number. The number of manipulators 130 is one in the example of FIG. 3. The manipulator 130 is, for example, a system including an articulated robot as illustrated in FIG. 4, a camera to capture, from above, images of objects to be picked by the robot, and a motion controller to control operations of the robot. For example, the manipulator 130 analyzes, using the motion controller, an image of the article 201 captured by the camera, thereby identifying the article 201. Then, the manipulator 130 controls, using the motion controller, a picking operation of the articulated robot, thereby picking the article 201 out of the container 211.

The database 140 is installed in the storage area 101, the picking area 102, the pick-up area 103, or another area in the same manner as the control apparatus 120. The database 140 is, for example, an RDBMS. The term "RDBMS" is an abbreviation of relational database management system. The database 140 is implemented separately from the control apparatus 120, in the present embodiment. Alternatively, the database 140 may be integrated with the control apparatus 120.

The database 140 holds inventory information 240 for the automated storage and retrieval system 110. The inventory information 240 includes identification information such as a barcode, a two-dimensional code, or an RFID attached to each container 210, or information indicating the storage position of each container 210 in the automated storage and retrieval system 110, in combination with information indicating the types of the articles 200 contained in each container 210. The inventory information 240 is updated when each container 210 is brought into the automated storage and retrieval system 110, and when each container 210 is taken out of the automated storage and retrieval system 110.

The input apparatus 150 is installed in the pick-up area 103, or another area that the user 220 can enter. The input apparatus 150 is installed, for example, at the front of the store 230. The input apparatus 150 is, for example, a physical key, a capacitive key, a pointing device, a touch screen integrally provided with a display, or a microphone. The input apparatus 150 is implemented separately from the control apparatus 120, in the present embodiment. Alternatively, the input apparatus 150 may be integrated with the control apparatus 120.

The output apparatus 160 is installed in the pick-up area 103, or another area that the user 220 can enter, in the same manner as the input apparatus 150. The output apparatus 160 is installed, for example, at the front of the store 230. The output apparatus 160 is, for example, a display or a speaker. The display is, for example, an LCD or an organic EL display. The term "LCD" is an abbreviation of liquid crystal display. The term "EL" is an abbreviation of electro luminescence. The output apparatus 160 is implemented separately from the control apparatus 120, in the present embodiment. Alternatively, the output apparatus 160 may be integrated with the control apparatus 120.

The conveyor 170 is installed in the picking area 102. The conveyor 170 is, for example, a belt conveyor, a chain conveyor, a conveyor applying an omni-wheel, a bot-type transfer device, or any combination thereof.

The pick-up box 180 is installed in the pick-up area 103. The pick-up box 180 is, for example, a box that can be opened and closed automatically or manually.

The automated storage and retrieval system 110 includes one or more racks 111 and one or more cranes 112.

The number of racks 111 may be any number. In the example of FIG. 3, the number of racks 111 is two. Each rack 111 may be configured to store any number of containers 210. In the example of FIG. 3, each rack 111 is configured as a high-density rack capable of storing twelve containers 210 in the vertical direction, twelve containers 210 in the horizontal direction, and one container 210 in the depth direction. In each rack 111, some space may be replaced with a space for installing the manipulator 130. In the example of FIG. 3, a space of one of the two racks 111 to store six containers 210 in the vertical direction and four containers 210 in the horizontal direction is replaced with a space for installing the manipulator 130.

The number of cranes 112 depends on the number of racks 111. In the example of FIG. 3, the number of cranes 112 is one. The crane 112 is installed in an aisle faced by the racks 111. In the example of FIG. 3, one crane 112 is installed in an aisle between the two racks 111. This aisle may be so narrow that a person cannot walk therethrough, as long as its width is sufficient for installing the crane 112. The crane 112 is a mini-load crane in the present embodiment. Alternatively, the crane 112 may be, for example, a unit-load crane or a mid-load crane.

In the present embodiment, the racks 111, the crane 112, or a combination of these are treated as a module, thereby increasing the scalability of the automated storage and retrieval system 110. That is, the configuration of the automated storage and retrieval system 110 can be determined or changed easily according to various requirements such as the footprint and the required article number of the store 230 where the article management system 100 is installed. Furthermore, components of the article management system 100 other than the automated storage and retrieval system 110, or a combination of components of the article management system 100 may be treated as a module, thereby increasing the overall scalability of the automated storage and retrieval system 110. That is, the overall configuration of the article management system 100 may be enabled to be determined or changed easily according to the various requirements of the store 230 where the article management system 100 is installed. For example, by configuring the automated storage and retrieval system 110 or other components of the article management system 100 with a small number of modules or a small-scale module, the article management system 100 can be easily installed in a roadside convenience store, a small convenience store inside a petrol station, inside a compound, inside an office building, or inside an apartment building, or a small kiosk of a railway station, serving as the store 230. Alternatively, by configuring the automated storage and retrieval system 110 or other components of the article management system 100 with a large number of modules or a large-scale module, the article management system 100 can be easily installed in a large convenience store or a large supermarket, serving as the store 230. Moreover, in a case in which the store 230 where the article management system 100 is installed has been closed, each module of the article management system 100 can be reused at a different store or another location.

In the present embodiment, the automated storage and retrieval system 110 stores the plurality of brought-in containers 210 separately in two or more compartments having temperature settings different from each other, according to the types of the articles 200 contained in each container 210. For example, the two racks 111 are as a whole divided into four compartments corresponding to four respective temperature ranges, which are frozen, chilled, constant, and ambient, and the plurality of brought-in containers 210 is stored separately in the four compartments according to the types of the articles 200 contained in each container 210. In that case, a container 210 containing products that need to be kept frozen such as frozen foods is stored in the frozen compartment. A container 210 containing products that need to be kept chilled is stored in the chilled compartment. A container 210 containing products that need to be kept at a constant temperature such as alcoholic beverages is stored in the constant compartment. A container 210 containing other products is stored in the ambient compartment.

The control apparatus 120 includes a controller 121, a memory 122, a communication interface 123, an input interface 124, and an output interface 125.

The controller 121 includes at least one processor, at least one dedicated circuit, or a combination thereof. The processor is a general purpose processor such as a CPU or a dedicated processor that is dedicated to specific processing. The term "CPU" is an abbreviation of central processing unit. The dedicated circuit is, for example, an FPGA or an ASIC. The term "FPGA" is an abbreviation of field-programmable gate array. The term "ASIC" is an abbreviation of application specific integrated circuit. The controller 121 executes information processing related to operations of the control apparatus 120 while controlling components of the control apparatus 120.

The memory 122 includes at least one semiconductor memory, at least one magnetic memory, at least one optical memory, or a combination of at least two of these. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 122 functions as, for example, a main memory, an auxiliary memory, or a cache memory. The memory 122 stores information to be used for the operations of the control apparatus 120, and information obtained by the operations of the control apparatus 120.

The communication interface 123 includes at least one interface for communication. The interface for communication is, for example, a LAN interface or an interface compliant with a mobile communication standard such as LTE, the 4G standard, or the 5G standard. The term "LAN" is an abbreviation of local area network. The term "LTE" is an abbreviation of Long Term Evolution. The term "4G" is an abbreviation of 4th generation. The term "5G" is an abbreviation of 5th generation. The communication interface 123 receives information to be used for the operations of the control apparatus 120 from the database 140 or another external device, and transmits information obtained by the operations of the control apparatus 120 to the database 140 or another external device.

The input interface 124 includes at least one interface for input. The interface for input is, for example, a USB interface. The term "USB" is an abbreviation of universal serial bus. The input interface 124 accepts an operation for inputting information to be used for the operations of the control apparatus 120 via the input apparatus 150.

The output interface 125 includes at least one interface for output. The interface for output is, for example, a USB interface. The output interface 125 outputs information obtained by the operations of the control apparatus 120 via the output apparatus 160.

The functions of the control apparatus 120 are realized by execution of a control program according to the present embodiment by a processor included in the controller 121. That is, the functions of the control apparatus 120 are realized by software. The control program is a program for causing a computer to execute the processes of steps included in the operations of the control apparatus 120, thereby enabling the computer to realize the functions corresponding to the processes of the steps. That is, the control program is a program for causing a computer to function as the control apparatus 120.

The program can be recorded on a computer readable recording medium. The computer readable recording medium is, for example, a magnetic recording device, an optical disc, a magneto-optical recording medium, or a semiconductor memory. The program is distributed, for example, by selling, transferring, or lending a portable recording medium such as a DVD or a CD-ROM on which the program is recorded. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program recorded on a portable recording medium or a program transferred from a server. Then, the computer reads the program stored in the main memory using a processor, and executes processes in accordance with the read program using the processor. The computer may read a program directly from the portable recording medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 120 may be realized by a dedicated circuit included in the controller 121. That is, some or all of the functions of the control apparatus 120 may be realized by hardware.

Operations of the article management system 100 according to the present embodiment will be described with reference to FIG. 7. These operations correspond to an article management method according to the present embodiment. The operations of FIG. 7 start when the user 220 visits the store 230.

In step S101, the controller 121 of the control apparatus 120 searches the database 140 to generate a list 250 of the types of articles 200 contained in a plurality of containers 210 stored in the automated storage and retrieval system 110. As a method for generating the list 250, any method may be used. One possible method in the present embodiment includes extracting information such as a product name, availability, and quantity from the inventory information 240 held in the database 140, for each SKU of the products for sale at the store 230, and generating, as the list 250, pages with a hierarchical structure to which the extracted information is posted. The controller 121 causes the output apparatus 160 to output the generated list 250 via the output interface 125. That is, the output apparatus 160 is controlled to output, to the user 220, the list 250 of the types of the articles 200 contained in the plurality of containers 210 stored in the automated storage and retrieval system 110. For example, a display included in the output apparatus 160 displays the list 250 on screen.

In step S102, the input apparatus 150 accepts an order operation for at least one article 201 by the user 220.

The input apparatus 150 accepts, as part of the order operation, an operation in which the user 220 selects the at least one article 201 from the list 250 outputted by the output apparatus 160. For example, a touch screen integrally provided with a display, which is included in the input apparatus 150, accepts an operation in which the user 220 adds, to a shopping cart, a product that the user 220 desires to purchase on a page displayed by the display. The order operation is completed by an operation in which the user 220 confirms purchase of the product added to the shopping cart, such as an operation to pay for the product. As a method for paying for the product, any method may be used. One possible method includes, for example, making a payment by cash, credit card, electronic money, points, or virtual currency via a payment system such as a POS system installed in the store 230. The term "POS" is an abbreviation of point of sale. The payment system may read identification information such as a barcode or a two-dimensional code displayed on a mobile device of the user 220 such as a smartphone or a tablet, or printed on a membership card of the user 220 to identify the user 220. Alternatively, the payment system may read identification information such as an ID recorded on the mobile device or the membership card of the user 220 to identify the user 220. The term "ID" is an abbreviation of identifier. The payment system may be provided as a part of the article management system 100, or as a separate system connected and coordinated with the article management system 100. In the former case, the payment system may be a system connected and coordinated with existing systems of retailers, or a stand-alone system that operates without being connected with the existing systems of the retailers. In the latter case, namely, in a case in which the payment system is a system separate from the article management system 100, the payment system may be a new system that is not included in the existing systems of the retailers, or a conventional system included in the existing systems of the retailers.

In the present embodiment, the controller 121 of the control apparatus 120 predicts an article 202 to be ordered by the order operation before the order operation is completed. As a method for predicting the article 202 to be ordered, any method may be used. One possible method in the present embodiment includes predicting that a product is to be purchased when the user 220 adds the product to the shopping cart. The controller 121 causes the crane 112 to move according to the storage position, in the racks 111, of a container 212 containing the predicted article 202 among the plurality of containers 210 stored in the automated storage and retrieval system 110. In a case in which the crane 112 reaches a position where the crane 112 can retrieve the container 212 before the order operation is completed, the controller 121 causes the crane 112 to stand by until the order operation is completed.

In step S103, the controller 121 of the control apparatus 120 identifies the article 201 selected by the order operation accepted at the input apparatus 150 via the input interface 124. The controller 121 searches the database 140 to identify a container 211 containing the identified article 201. As a method for identifying the container 211, any method may be used. One possible method in the present embodiment includes extracting identification information of the container 211 containing the article 201, or information indicating the storage position of the container 211 from the inventory information 240 held in the database 140. The controller 121 causes the automated storage and retrieval system 110 to take out the identified container 211 to the picking area 102, via the communication interface 123. That is, the automated storage and retrieval system 110 is controlled to take out, to the picking area 102, the container 211 containing the at least one article 201 to be picked up at the pick-up area 103, among the plurality of containers 210 stored in the automated storage and retrieval system 110, in response to the order operation accepted at the input apparatus 150. Specifically, the crane 112 moves along the aisle faced by the racks 111 to retrieve the container 211, and takes out the retrieved container 211 to the picking area 102.

In step S104, the controller 121 of the control apparatus 120 controls picking by the manipulator 130, via the communication interface 123. That is, the manipulator 130 is controlled to perform the picking. The picking is an operation to pick, at the picking area 102, the at least one article 201 out of the container 211 taken out by the automated storage and retrieval system 110. Identification information such as a barcode, a two-dimensional code, or an RFID attached to the article 201, or an image of the article 201, which is to be inputted to the manipulator 130 for the control of the picking, is specified directly or indirectly by the order operation accepted at the input apparatus 150.

In the present embodiment, the manipulator 130, before performing the picking, learns appearance of articles 200 of a plurality of types. As a method for learning the appearance, any method such as machine learning or other AI-based learning may be used. One possible method in the present embodiment includes loading a product image into a memory for each SKU of the products for sale at the store 230. The term "AI" is an abbreviation of artificial intelligence. The manipulator 130, when performing the picking, observes the appearance of the articles 200 contained in the container 211 taken out by the automated storage and retrieval system 110. As a method for observing the appearance, any method may be used. One possible method in the present embodiment includes capturing images of the articles 200 contained in the container 211, using a camera. The manipulator 130 identifies the at least one article 201 according to learning and observation results. As a method for identifying the article 201, any method may be used. One possible method in the present embodiment includes comparing the images loaded in the memory and the images captured by the camera to identify the target article 201 from among the articles 200 the images of which are captured by the camera.

In step S105, the controller 121 of the control apparatus 120 causes, via the communication interface 123, the conveyor 170 to feed the at least one article 201 picked by the picking, into the pick-up box 180, which is to be used by the user 220 to pick up the article 201 at the pick-up area 103. That is, the conveyor 170 is controlled to transport, to the pick-up area 103, the at least one article 201 picked by the picking.

As a variation of the present embodiment, even in a case in which the controller 121 of the control apparatus 120 supports picking by a person in step S104, the conveyor 170 transports, to the pick-up area 103, the at least one article 201 picked by the picking in step S105.

According to the present embodiment, the user 220, who purchases a product, does not need to take the product off a store shelf by hand and bring it to a register. The user 220 can pick up the product at the pick-up area 103 and take it home straight away.

As described above, in the present embodiment, the automated storage and retrieval system 110 stores a plurality of containers 210, each container 210 containing one or more articles 200. The automated storage and retrieval system 110 takes out, to a picking area 102 adjacent to a pick-up area 103, a container 211 containing at least one article 201 to be picked up at the pick-up area 103, among the plurality of containers 210. The control apparatus 120 controls picking, at the picking area 102, the at least one article 201 out of the container 211 taken out by the automated storage and retrieval system 110.

Therefore, according to the present embodiment, the article number density per footprint can be increased.

In the present embodiment, a mini-load crane meets the task of loading and unloading of totes stored in high-density racks. The mini-load crane includes a horizontally moving rail for conveying totes while moving the crane alongside the space between the high-density racks, and vertically moving platforms each equipped with a telescoping mechanism enabling the crane to retrieve totes from the high-density racks. Each high-density rack may be able to store two or more totes in the depth direction.

An articulated robot includes an automatically exchangeable end of arm tooling. The end-of-arm tooling is specifically a suction-type gripper, but may be automatically changed to other types of grippers or hands, depending on the product. The articulated robot performs the task of picking products directly from totes to process an order placed using a front user panel which is a display with a touch screen.

Therefore, according to the present embodiment, shopping process can be fully automated. That is, the store 230 can be fully unmanned. However, the store 230 may be operated in a hybrid form of a manned store and an unmanned store. For example, the article management system 100 according to the present embodiment may be installed in a 24-hour convenience store together with conventional store shelves and registers, and the convenience store may be operated as a manned store from morning through evening, and as an unmanned store at night.

According to the present embodiment, orders can be fulfilled by robots and automation modules instead of people working in small footprint shops or kiosks in commercial locations.

According to the present embodiment, products can be brought, in the store 230, from a storage area 101 to the pick-up area 103 without human intervention. Furthermore, the article number density of the storage area 101 can be increased.

As a variation of the present embodiment, an API for connecting and coordinating various existing systems of retailers, such as an IMS, an ERP system, and a payment system including a POS system, with the article management system 100 may be specified. The term "IMS" is an abbreviation of inventory management system. The term "ERP" is an abbreviation of enterprise resource planning. The term "API" is an abbreviation of application programming interface. According to this variation, the article management system 100 can be provided as a turnkey system via the API.

As a variation of the present embodiment, the controller 121 of the control apparatus 120 may change the storage position of each container 210 according to the order frequencies of the articles 200 contained in each container 210. Specifically, the controller 121 may store totes containing frequently ordered products in a rack 111 close to the manipulator 130. According to this variation, the cycle time can be shortened.

As a variation of the present embodiment, when totes are delivered from a distribution center, a clerk or a truck driver may put the totes to an injection point, and scan identification labels such as barcodes attached to the totes, using a scanner provided at the injection point. In that case, the controller 121 of the control apparatus 120 determines respective storage positions of the totes in the automated storage and retrieval system 110 according to the contents of the totes identified by the scanner. The crane 112 stores the totes in the respective storage positions determined by the controller 121.

As a variation of the present embodiment, when a first tote is delivered from the distribution center, a clerk may perform a sorting operation while transferring the contents of the first tote to a second tote, which is a different tote. Then, the clerk may put the second tote to the injection point, and scan an identification label such as a barcode attached to the second tote, using a scanner provided at the injection point. In that case, the controller 121 of the control apparatus 120 determines a storage position of the second tote in the automated storage and retrieval system 110 according to the contents of the second tote identified by the scanner. The crane 112 stores the second tote in the storage position determined by the controller 121. The controller 121 updates inventory information 240 to add, into the database 140, identification information of the second tote or information indicating the storage position of the second tote in combination with information indicating one or more SKUs in the second tote. The information indicating the SKUs in the second tote is acquired by, for example, scanning identification labels such as barcodes attached to products in the second tote during the sorting operation.

Second Embodiment

Figure 8:
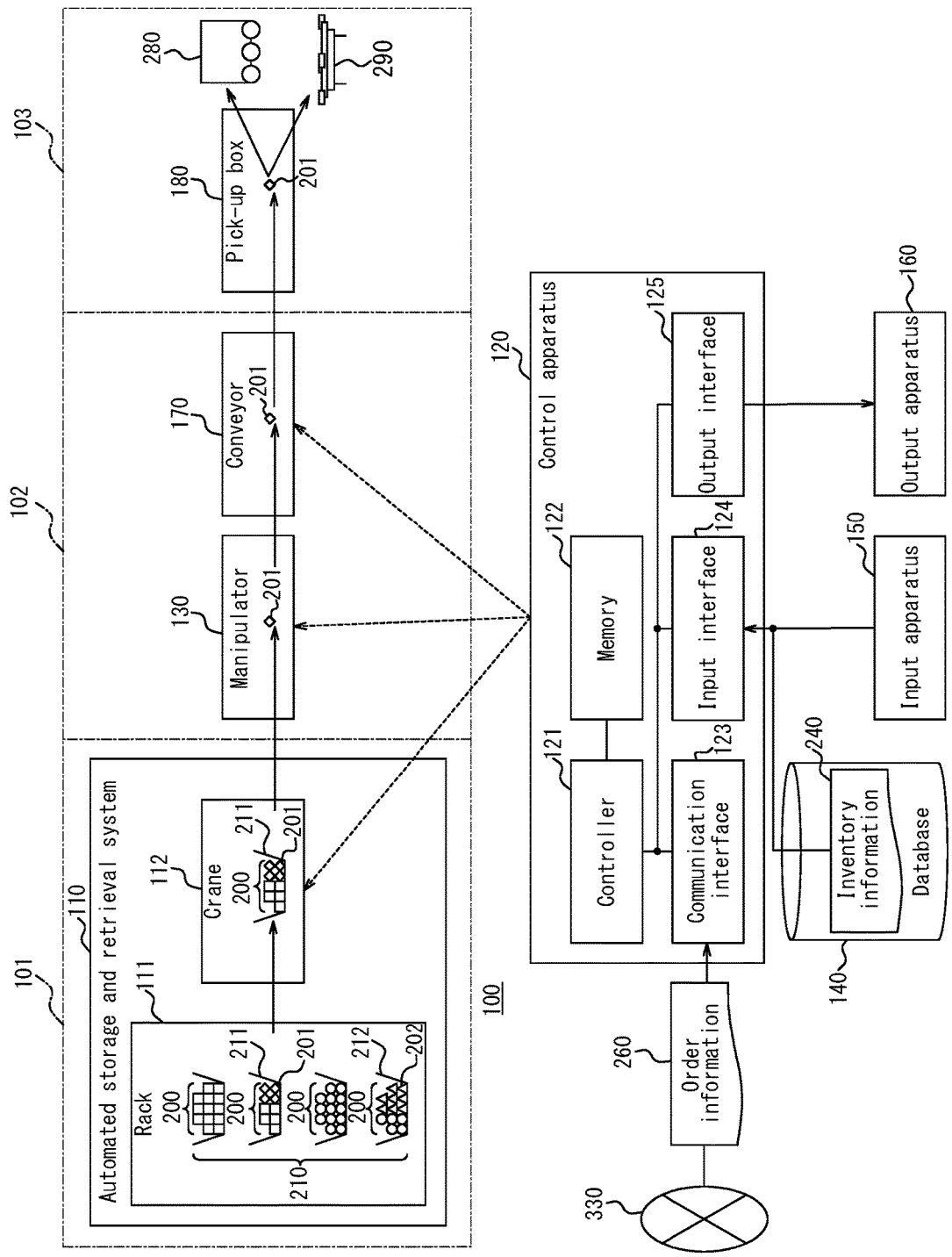
FIG. 8 is a block diagram illustrating a configuration of an article management system according to a second embodiment.

An outline of the present embodiment will be described with reference to FIG. 8.

In the first embodiment, a user 220 picks up, at a pick-up area 103, at least one article 201 picked by picking. In the present embodiment, a mobile robot 280 or a drone 290 picks up such an article 201 at a pick-up area 103 to deliver the article 201 to a user 220.

A configuration of an article management system 100 according to the present embodiment will be described with reference to FIG. 8. Descriptions of portions common to the configuration of the article management system 100 according to the first embodiment are omitted.

The article management system 100 includes either or both of the mobile robot 280 and the drone 290.

The mobile robot 280 is, for example, a 4-wheel robot or a 6-wheel robot.

The drone 290 is, for example, a multicopter.

Operations of the article management system 100 according to the present embodiment will be described with reference to FIG. 9. These operations correspond to an article management method according to the present embodiment. Descriptions of portions common to the operations of the article management system 100 according to the first embodiment are omitted. The operations of FIG. 9 start when the user 220 orders at least one article 201 at an e-commerce site.

In step S201, a controller 121 of a control apparatus 120 receives order information 260 for the at least one article 201 transmitted through a network 330 such as the Internet, via a communication interface 123. The order information 260 includes identification information such as a barcode, a two-dimensional code, or an RFID attached to the article 201 that the user 220 has ordered at the e-commerce site, or an image of the article 201.

In step S202, the controller 121 of the control apparatus 120 identifies the article 201, which is associated with the received order information 260. The controller 121 searches the database 140 to identify a container 211 containing the identified article 201. The controller 121 causes an automated storage and retrieval system 110 to take out the identified container 211 to the picking area 102, via the communication interface 123. That is, the automated storage and retrieval system 110 is controlled to take out, to the picking area 102, the container 211 containing the at least one article 201 to be picked up at the pick-up area 103, among a plurality of containers 210 stored in the automated storage and retrieval system 110, in response to the order information 260 received at the control apparatus 120.

Figure 7:
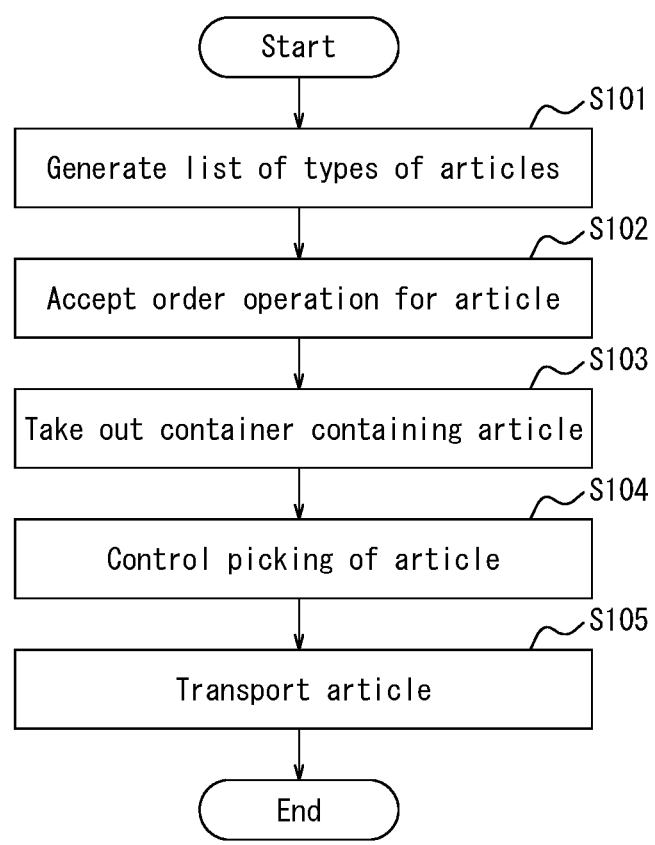
FIG. 7 is a flowchart illustrating operations of the article management system according to the first embodiment.

The process of step S203 is equivalent to that of step S104 of FIG. 7, and thus descriptions thereof are omitted. Identification information such as a barcode, a two-dimensional code, or an RFID attached to the article 201, or an image of the article 201, which is to be inputted to a manipulator 130 for control of picking, is specified directly or indirectly by the order information 260 received at the control apparatus 120.

In step S204, the controller 121 of the control apparatus 120 causes, via the communication interface 123, a conveyor 170 to load the at least one article 201 picked by the picking, onto the mobile robot 280 or the drone 290, which stands by at the pick-up area 103. That is, the conveyor 170 is controlled to transport, to the pick-up area 103, the at least one article 201 picked by the picking. The mobile robot 280 or the drone 290 picks up the article 201 at the pick-up area 103.

In step S205, the controller 121 of the control apparatus 120 causes the mobile robot 280 or the drone 290 to deliver the loaded article 201 to the user 220, via the communication interface 123. That is, the mobile robot 280 or the drone 290 is controlled to deliver, to the user 220, the article 201 picked up at the pick-up area 103. Address information such as a home address of the user 220 or any delivery address specified by the user 220, which is to be inputted to the mobile robot 280 or the drone 290, is specified directly or indirectly by the order information 260 received at the control apparatus 120.

According to the present embodiment, the user 220, who has purchased a product, does not need to visit a store 230 in order to pick up the product; therefore the convenience is improved.

Third Embodiment

Figure 10:
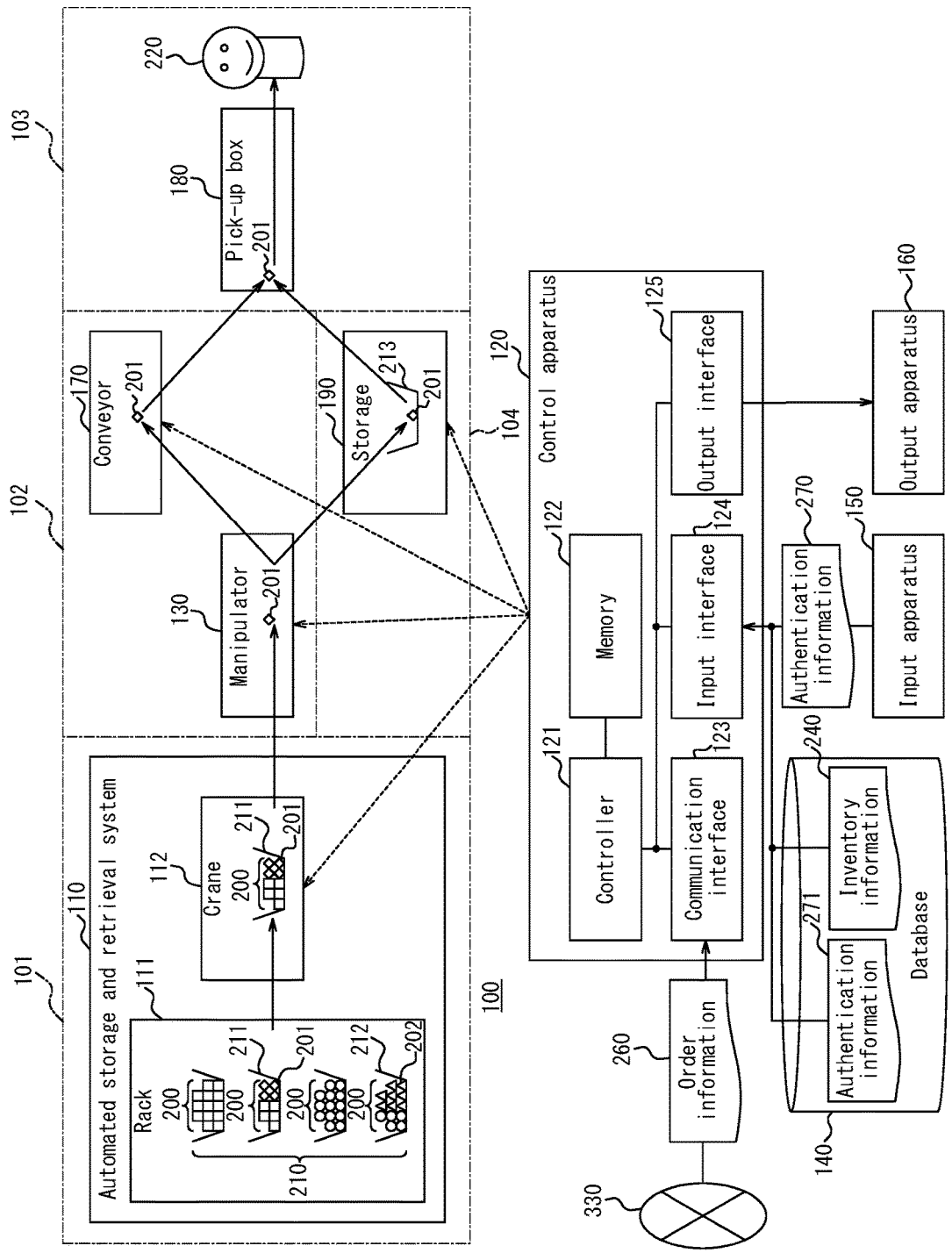
FIG. 10 is a block diagram illustrating a configuration of an article management system according to a third embodiment.
Figure 11:
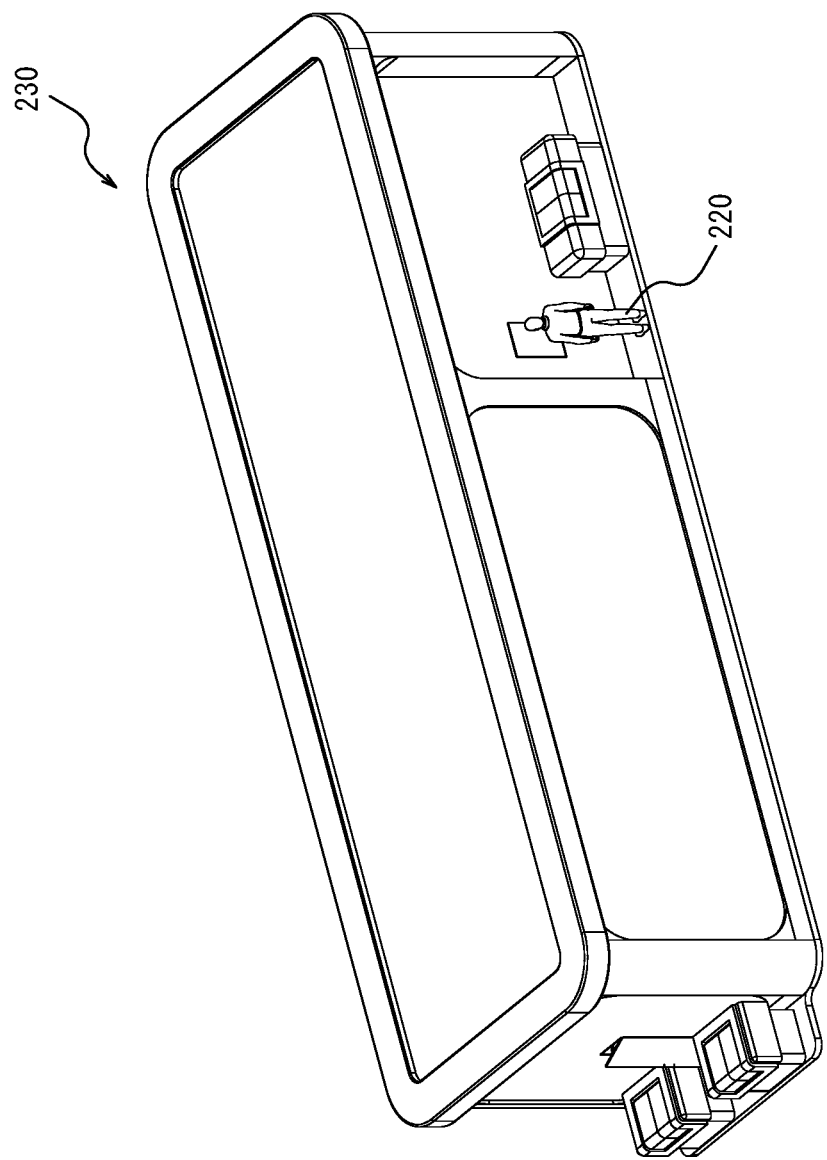
FIG. 11 is a perspective view of a store where the article management system according to the third embodiment is installed.
Figure 12:
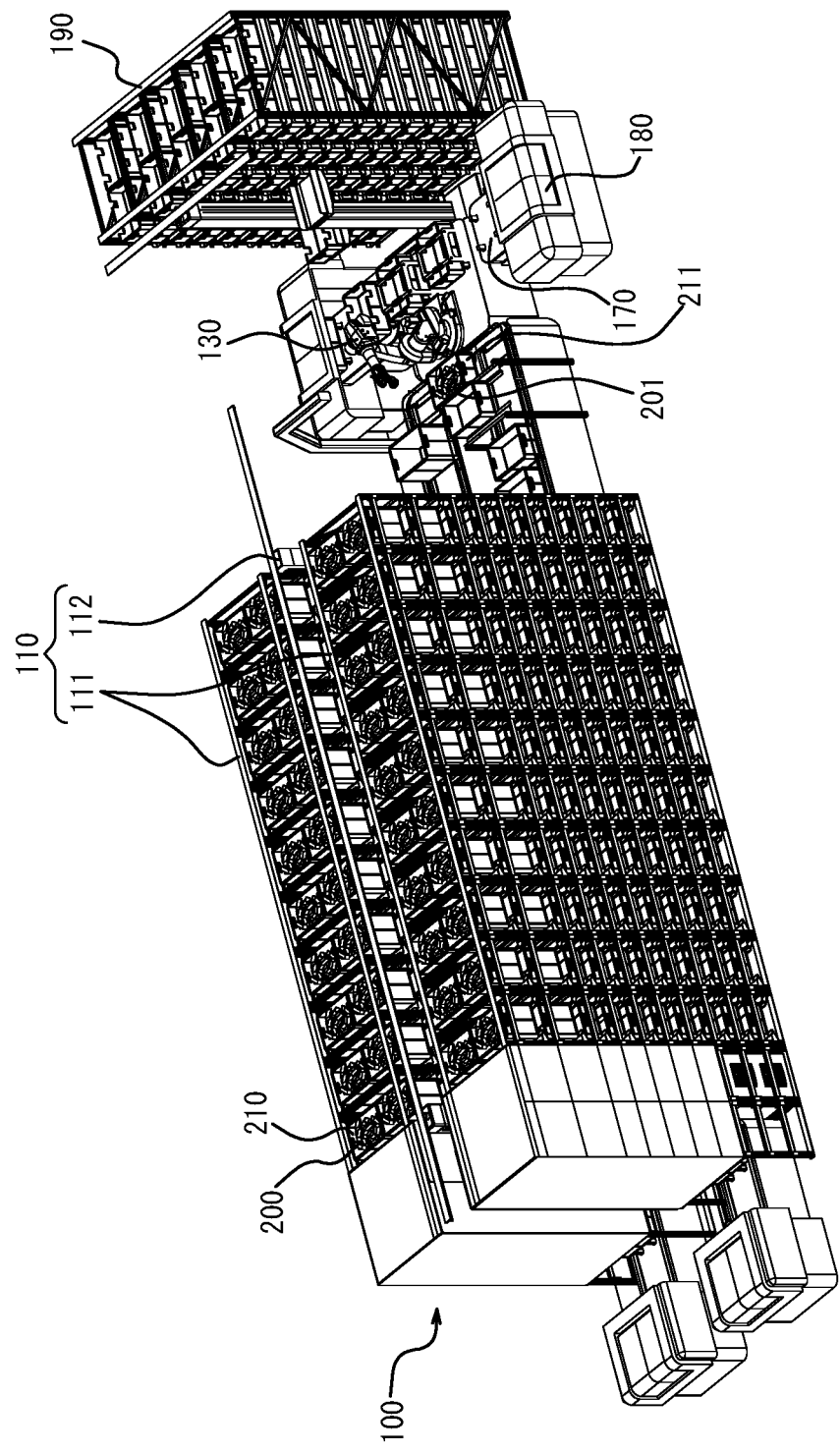
FIG. 12 is a perspective view of the article management system according to the third embodiment.

An outline of the present embodiment will be described with reference to FIGS. 10, 11, and 12.

In the first embodiment, picking is performed when a user 220 visits a store 230. In the present embodiment, picking is performed before a user 220 visits a store 230.

A configuration of an article management system 100 according to the present embodiment will be described with reference to FIGS. 10 to 12. Descriptions of portions common to the configuration of the article management system 100 according to the first embodiment are omitted.

The article management system 100 includes a storage 190.

The storage 190 is installed in a pre-order area 104, which is for temporary storage of an article 201 to be picked up by the user 220. The storage 190 is a crane type AS/RS in the present embodiment. Alternatively, the storage 190 may be, for example, a rotary shelf type, shuttle type, or bot type AS/RS, or a warehouse other than an AS/RS.

Operations of the article management system 100 according to the present embodiment will be described with reference to FIG. 13. These operations correspond to an article management method according to the present embodiment. Descriptions of portions common to the operations of the article management system 100 according to the first embodiment or the second embodiment are omitted. The operations of FIG. 13 start when the user 220 orders at least one article 201 at an e-commerce site, stop when the article 201 is stored temporarily, and resume when the user 220 visits the store 230.

Figure 9:
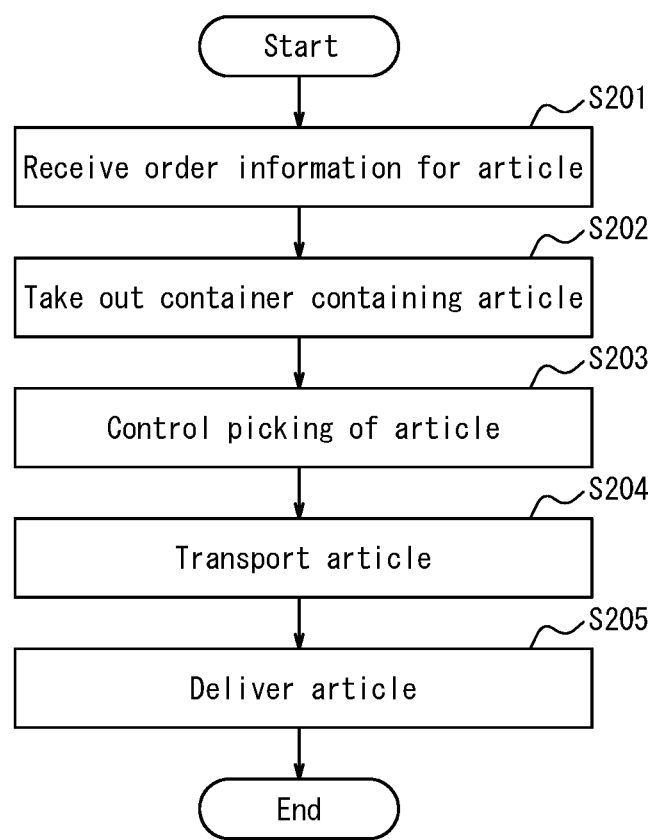
FIG. 9 is a flowchart illustrating operations of the article management system according to the second embodiment.

The processes of steps S301 to S303 are equivalent to those of steps S201 to S203 of FIG. 9, and thus descriptions thereof are omitted.

In step S304, a controller 121 of a control apparatus 120 causes the storage 190 to temporarily store the at least one article 201 picked by picking, via a communication interface 123. That is, the storage 190 is controlled to temporarily store the at least one article 201 picked by the picking. Specifically, a crane of the storage 190 moves along an aisle faced by a rack of the storage 190 to store a container 213 containing the article 201, which is transferred thereto at the time of the picking. A database 140 holds identification information such as a barcode, a two-dimensional code, or an RFID attached to the container 213, or information indicating the storage position of the container 213 in the storage 190, in association with authentication information 271 such as a claim reference number. The authentication information 271 may be provided from the e-commerce site as part of order information 260 received at the control apparatus 120. Alternatively, the authentication information 271 may be newly generated by the controller 121 when the container 213 is brought into the storage 190, and the user 220 may be informed of the authentication information 271 through a network 330 such as the Internet.

As a variation of the present embodiment, even in a case in which the controller 121 of the control apparatus 120 supports picking by a person in step S303, the storage 190 temporarily stores the at least one article 201 picked by the picking in step S304.

In step S305, an input apparatus 150 accepts an input operation, by the user 220, of authentication information 270 for picking up the at least one article 201. For example, a touch screen integrally provided with a display, which is included in the input apparatus 150, accepts an operation in which the user 220 inputs a claim reference number, of which the user 220 has been informed through the network 330 from the e-commerce site or the control apparatus 120. The controller 121 of the control apparatus 120 acquires the authentication information 270 inputted by the input operation accepted at the input apparatus 150, via an input interface 124.

The controller 121 checks the acquired authentication information 270 against the database 140, and then terminates the operations in a case in which the authentication fails. That is, the controller 121 terminates the operations in a case in which valid authentication information 271 identical to the acquired authentication information 270 is not held in the database 140. On the other hand, in a case in which the authentication succeeds, namely, in a case in which valid authentication information 271 identical to the acquired authentication information 270 is held in the database 140, the controller 121 searches the database 140 to identify the container 213, which is associated with the authentication information 271, in step S306. As a method for identifying the container 213, any method may be used. One possible method in the present embodiment includes extracting the identification information of the container 213, or the information indicating the storage position of the container 213, which is held in the database 140 in association with the authentication information 271. The controller 121 causes the storage 190 to take out the identified container 213 to a pick-up area 103, via the communication interface 123. That is, the storage 190 is controlled to take out the at least one article 201 to the pick-up area 103 in response to the input operation accepted at the input apparatus 150. Specifically, the crane of the storage 190 moves along the aisle faced by the rack of the storage 190 to retrieve the container 213 containing the article 201, and takes out the retrieved container 213 to the pick-up area 103.

According to the present embodiment, the user 220, who has ordered a product, does not need to wait at the store 230 for completion of the taking out by an automated storage and retrieval system 110, and the picking by a manipulator 130. The user 220 can pick up the product in a short time after arriving at the store 230.

Fourth Embodiment

Figure 14:
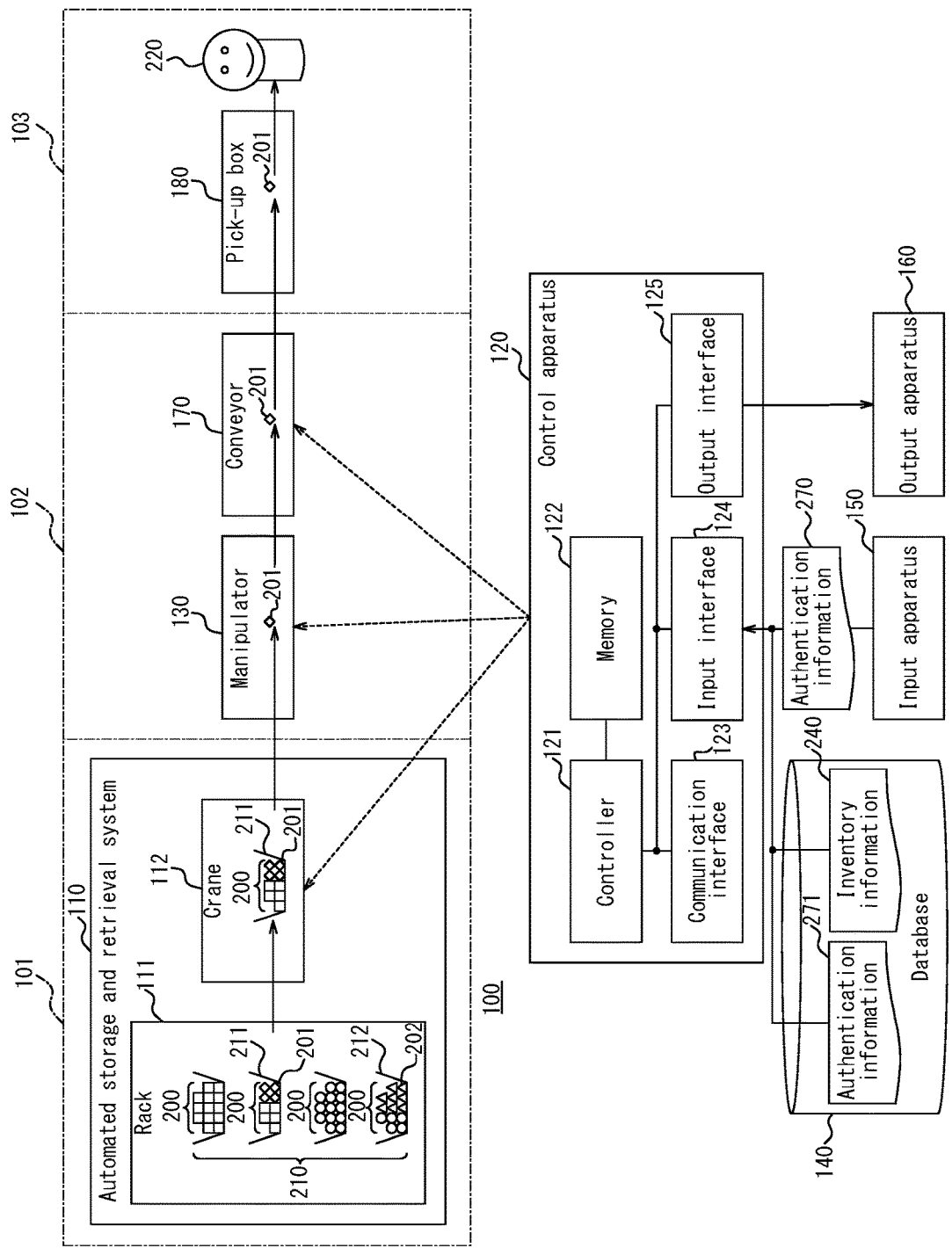
FIG. 14 is a block diagram illustrating a configuration of an article management system according to a fourth embodiment.

An outline of the present embodiment will be described with reference to FIG. 14.

In the first embodiment, an article management system 100 is installed in a retailer's store 230. In the present embodiment, an article management system 100 is installed in a courier's delivery location.

Each article 200 is a package held at the delivery location, in the present embodiment. At least one article 201 to be picked up by a user 220 is a package addressed to the user 220, in the present embodiment.

In the present embodiment, inventory information 240 held in a database 140 includes identification information such as a barcode, a two-dimensional code, or an RFID attached to each container 210, or information indicating the storage position of each container 210 in an automated storage and retrieval system 110, in combination with identification information such as barcodes, two-dimensional codes, or RFIDs attached to articles 200 contained in each container 210. The database 140 holds, in addition to the inventory information 240, valid authentication information 271 for each article 200 contained in a plurality of containers 210 stored in the automated storage and retrieval system 110. Specifically, the database 140 holds the identification information such as a barcode, a two-dimensional code, or an RFID attached to each article 200, in association with the authentication information 271, such as a claim reference number. The user 220 to whom each article 200 is addressed shall have been in any way notified of information equivalent to the authentication information 271.

Operations of the article management system 100 according to the present embodiment will be described with reference to FIG. 15. These operations correspond to an article management method according to the present embodiment. Descriptions of portions common to the operations of the article management system 100 according to the first embodiment or or the third embodiment are omitted. The operations of FIG. 15 start when the user 220 visits the delivery location.

In step S401, an input apparatus 150 accepts an input operation, by the user 220, of authentication information 270 for picking up at least one article 201. For example, a touch screen integrally provided with a display, which is included in the input apparatus 150, accepts an operation in which the user 220 inputs a claim reference number. A controller 121 of a control apparatus 120 acquires the authentication information 270 inputted by the input operation accepted at the input apparatus 150, via an input interface 124.

The controller 121 checks the acquired authentication information 270 against the database 140, and then terminates the operations in a case in which the authentication fails. That is, the controller 121 terminates the operations in a case in which valid authentication information 271 identical to the acquired authentication information 270 is not held in the database 140. On the other hand, in a case in which the authentication succeeds, namely, in a case in which valid authentication information 271 identical to the acquired authentication information 270 is held in the database 140, the controller 121 searches the database 140 to identify the article 201, which is associated with the authentication information 271, and further identify a container 211 containing the identified article 201, in step S402. As a method for identifying the article 201, any method may be used. One possible method in the present embodiment includes extracting the identification information of the article 201, which is held in the database 140 in association with the authentication information 271. As a method for identifying the container 211, any method may be used. One possible method in the present embodiment includes extracting identification information of the container 211 containing the article 201, or information indicating the storage position of the container 211 from the inventory information 240 held in the database 140. The controller 121 causes the automated storage and retrieval system 110 to take out the identified container 211 to the picking area 102, via the communication interface 123. That is, the automated storage and retrieval system 110 is controlled to take out, to the picking area 102, the container 211 containing the at least one article 201 to be picked up at the pick-up area 103, among the plurality of containers 210 stored in the automated storage and retrieval system 110, in response to the input operation accepted at the input apparatus 150.

The processes of steps S403 and S404 are equivalent to those of steps S104 and S105 of FIG. 7, and thus descriptions thereof are omitted. Identification information such as a barcode, a two-dimensional code, or an RFID attached to the article 201, or an image of the article 201, which is to be inputted to a manipulator 130 for control of picking, is held in the database 140 in association with the authentication information 271.

According to the present embodiment, the user 220, to whom a package is addressed, can pick up the package at the pick-up area 103.

In the present embodiment, the user 220 picks up, at the pick-up area 103, the at least one article 201 picked by the picking, in the same manner as the first embodiment. As a variation of the present embodiment, a mobile robot 280 or a drone 290 may pick up the article 201 at the pick-up area 103 to deliver the article 201 to the user 220, in the same manner as the second embodiment.

As a variation of the present embodiment, the picking may be performed before the user 220 visits the delivery location, and a storage 190 may temporarily store the at least one article 201 picked by the picking, in the same manner as the third embodiment. In that case, the storage 190 takes out the at least one article 201 to the pick-up area 103 in response to the input operation accepted at the input apparatus 150 when the user 220 visits the delivery location.

Fifth Embodiment

Figure 16:
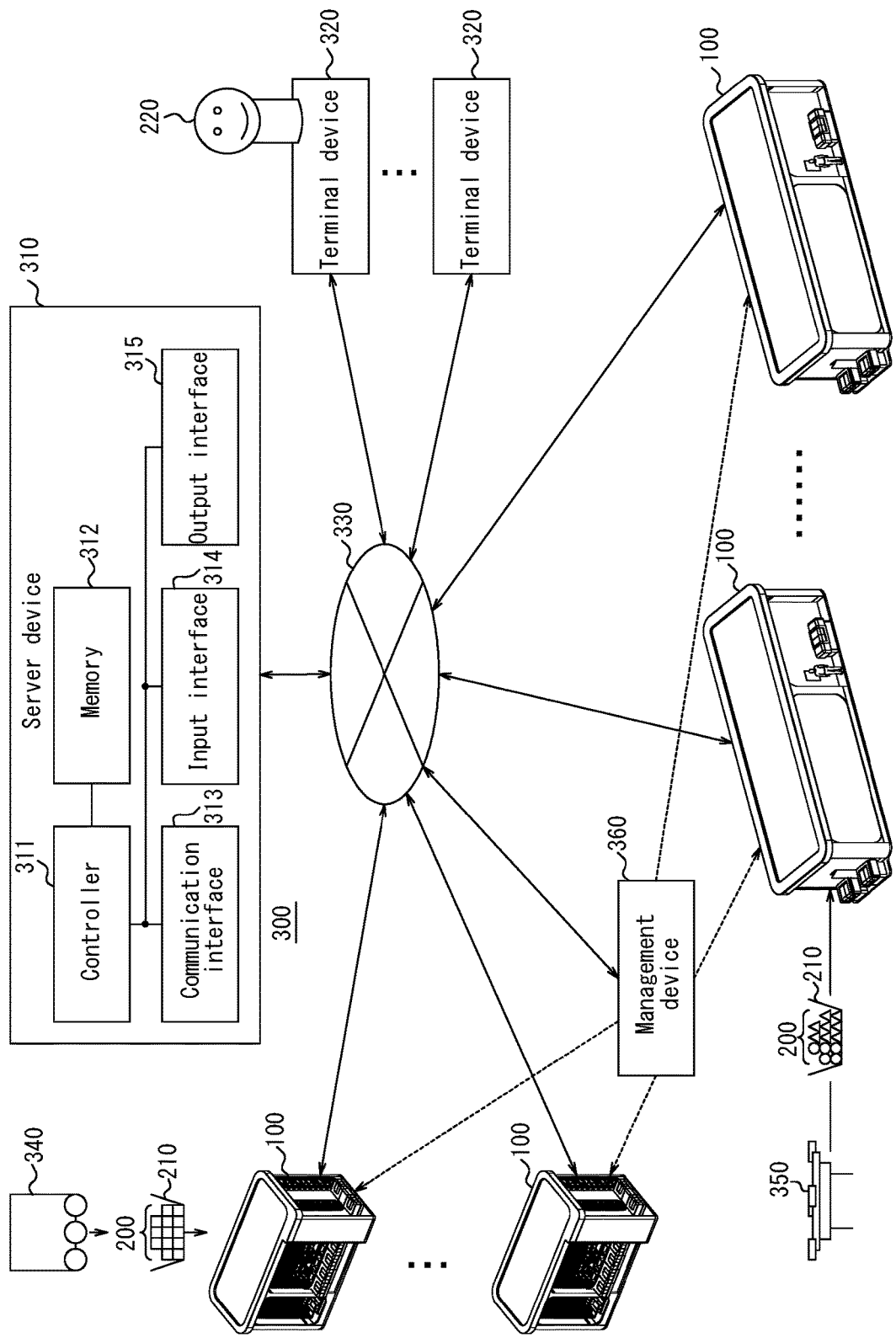
FIG. 16 is a block diagram illustrating a configuration of a logistics system according to a fifth embodiment.

A configuration of a logistics system 300 according to the present embodiment will be described with reference to FIG. 16.

A logistics system 300 includes a plurality of article management systems 100 according to the first or third embodiment, a server device 310, terminal devices 320, a mobile robot 340, a drone 350, and a management device 360.

The server device 310 may be installed in any location. The server device 310 is installed in a data center, in the present embodiment. The server device 310 is a computer. The server device 310 is connected with each article management system 100 via a network 330 such as the Internet.

The terminal devices 320 are used by users 220. The terminal devices 320 are, for example, mobile devices such as smartphones or tablets, or PCs. The term "PC" is an abbreviation of personal computer.

The mobile robot 340 is, for example, a 4-wheel robot or a 6-wheel robot. The mobile robot 340 delivers, to each article management system 100, articles 200 to be brought into an automated storage and retrieval system 110 of each article management system 100.

The drone 350 is, for example, a multicopter. The drone 350 delivers, to each article management system 100, articles 200 to be brought into the automated storage and retrieval system 110 of each article management system 100.

The management device 360 may be installed in any location. The management device 360 is installed in a manned store such as a manned convenience store, in the present embodiment. The management device 360 is used by a manager of the manned store. The management device 360 is, for example, a mobile device such as a smartphone or a tablet, or a PC. The management device 360 centrally monitors and controls the plurality of article management systems 100.

The manned store where the management device 360 is installed is deployed as a parent store, and stores 230 where the plurality of article management systems 100 is installed are deployed as satellites. According to the present embodiment, while ensuring the needs for the functions of the manned store, a new franchise model that can increase profits and reduce burdens of franchise owners can be realized.

The server device 310 includes a controller 311, a memory 312, a communication interface 313, an input interface 314, and an output interface 315.

The controller 311 includes at least one processor, at least one dedicated circuit, or a combination thereof. The processor is a general purpose processor such as a CPU or a dedicated processor that is dedicated to specific processing. The dedicated circuit is, for example, an FPGA or an ASIC. The controller 311 executes information processing related to operations of the server device 310 while controlling components of the server device 310.

The memory 312 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 312 functions as, for example, a main memory, an auxiliary memory, or a cache memory. The memory 312 stores information to be used for the operations of the server device 310, and information obtained by the operations of the server device 310.

The communication interface 313 includes at least one interface for communication. The interface for communication is, for example, a LAN interface or an interface compliant with a mobile communication standard such as LTE, the 4G standard, or the 5G standard. The communication interface 313 communicates with external devices such as a control apparatus 120 of each article management system 100, and the terminal devices 320 of the users 220. The communication interface 313 receives information to be used for the operations of the server device 310 from the external devices, and transmits information obtained by the operations of the server device 310 to the external devices.

The input interface 314 includes at least one interface for input. The interface for input is, for example, a USB interface. The input interface 314 accepts an operation for inputting information to be used for the operations of the server device 310 via an input apparatus.

The output interface 315 includes at least one interface for output. The interface for output is, for example, a USB interface. The output interface 315 outputs information obtained by the operations of the server device 310 via an output apparatus.

The functions of the server device 310 are realized by execution of a server program according to the present embodiment by a processor included in the controller 311. That is, the functions of the server device 310 are realized by software. The server program is a program for causing a computer to execute the processes of steps included in the operations of the server device 310, thereby enabling the computer to realize the functions corresponding to the processes of the steps. That is, the server program is a program for causing a computer to function as the server device 310.

Some or all of the functions of the server device 310 may be realized by a dedicated circuit included in the controller 311. That is, some or all of the functions of the server device 310 may be realized by hardware.

Figure 17:
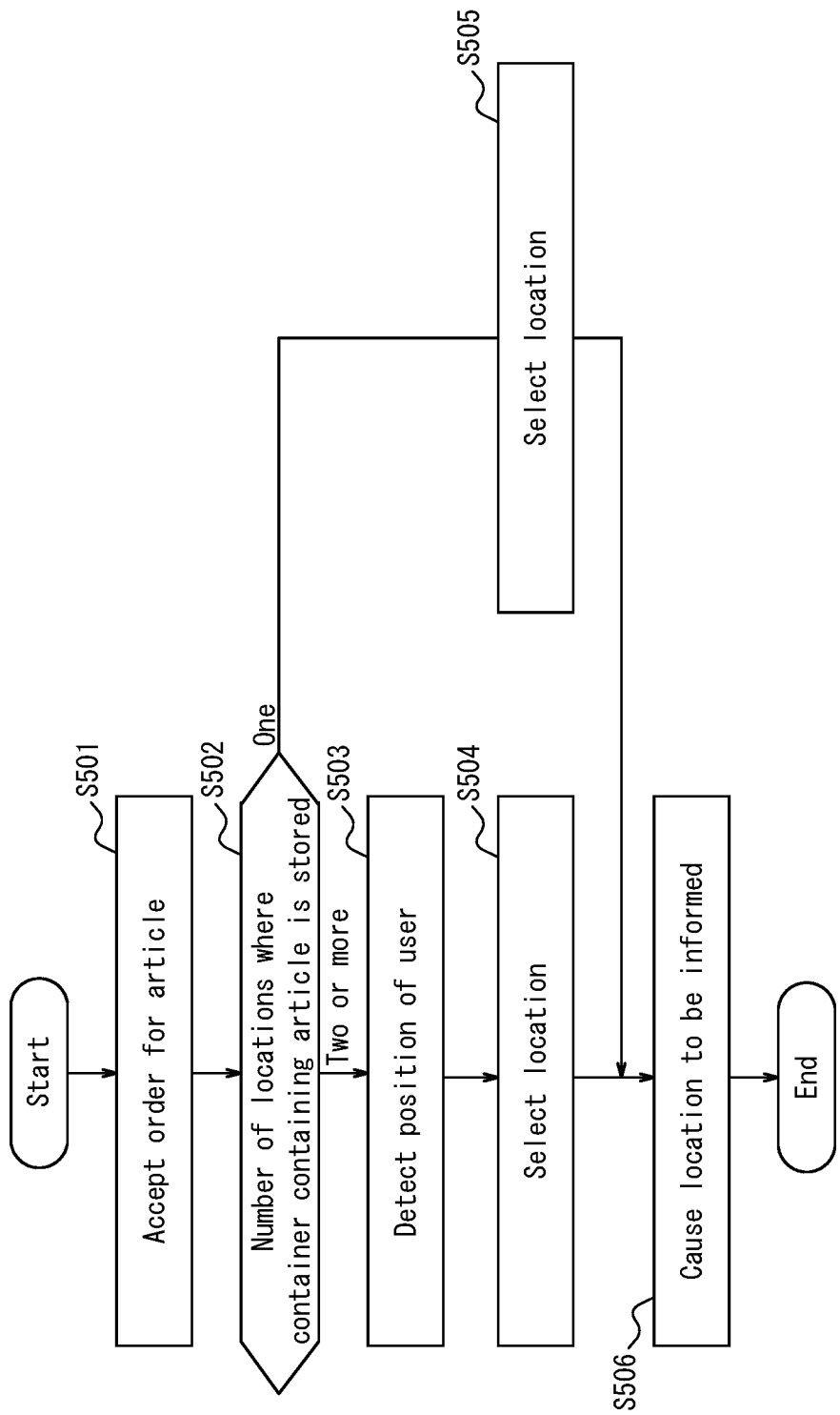
FIG. 17 is a flowchart illustrating operations of a server device according to the fifth embodiment.

Operations of the server device 310 according to the present embodiment will be described with reference to FIG. 17. These operations correspond to a service provision method according to the present embodiment.

In step S501, the controller 311 accepts a designation or a pre-order for at least one article 201 via the communication interface 313. Specifically, the controller 311 accepts a designation or a pre-order for the article 201 at an e-commerce site by a user 220.

In step S502, the controller 311 identifies, from among a plurality of locations, a location where a container 211 containing the designated or pre-ordered article 201 is stored in the corresponding automated storage and retrieval system 110, with reference to inventory information 240 for an article management system 100 installed in each location of the plurality of locations. Specifically, the controller 311 communicates with the control apparatus 120 of each article management system 100 via the communication interface 313, and searches a database 140 of each article management system 100 to identify the container 211 containing the designated or pre-ordered article 201. As a method for identifying the container 211, any method may be used. One possible method in the present embodiment includes extracting identification information of the container 211 containing the article 201, or information indicating the storage position of the container 211 from the inventory information 240 held in the database 140. The controller 311 identifies a store 230 where the article management system 100 including the automated storage and retrieval system 110 storing the identified container 211 is installed.

In a case in which there are two or more locations where a container 211 containing the designated or pre-ordered article 201 is stored in the corresponding automated storage and retrieval system 110, the controller 311 detects the position of the user 220 via the communication interface 313, in step S503. Then, in step S504, the controller 311 selects a location, of which a terminal device 320 is to be informed, from among the two or more locations according to distances between the detected position and the two or more locations. Specifically, the controller 311 acquires positional information for the terminal device 320 of the user 220, who has designated or pre-ordered the article 201, in a case in which the number of identified stores 230 is two or more. Then, the controller 311 selects, from among the identified stores 230, a store 230 that is located within a reference range from or is closest to the position indicated by the acquired positional information.

In a case in which there is only one location where a container 211 containing the designated or pre-ordered article 201 is stored in the corresponding automated storage and retrieval system 110, the controller 311 selects the location in step S505. Specifically, the controller 311 selects the identified store 230 in a case in which the number of identified stores 230 is one.

In step S506, the controller 311 informs the terminal device 320 of the selected location via the communication interface 313. Specifically, the controller 311 transmits information regarding the selected store 230 to the terminal device 320 of the user 220, who has designated the article 201, to prompt the user 220 to purchase the article 201 at the store 230. Alternatively, the controller 311 transmits information regarding the selected store 230 to the terminal device 320 of the user 220, who has ordered the article 201, to prompt the user 220 to pick up the article 201 at the store 230.

According to the present embodiment, the user 220, who purchases a product or has already ordered the product, can know of a store 230 that has the product and is close to the user 220; therefore the convenience is improved.

Sixth Embodiment

Figure 18:
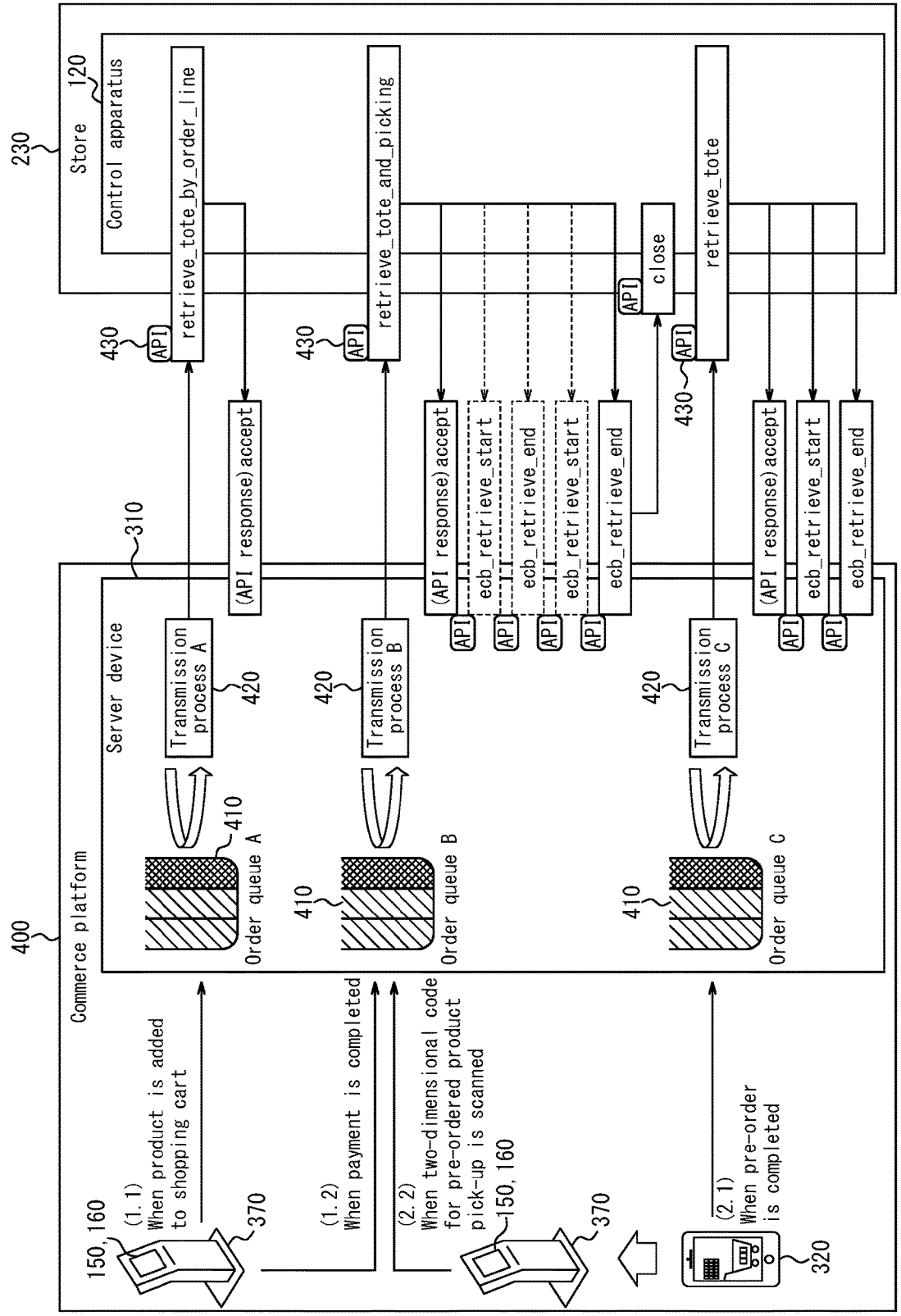
FIG. 18 is a diagram illustrating processes executed in an article management system according to a sixth embodiment.

A configuration of an article management system 100 according to the present embodiment will be described with reference to FIG. 18. Descriptions of portions common to the configuration of the article management system 100 according to the first embodiment are omitted.

The article management system 100 includes a commerce platform 400.

The commerce platform 400 includes a server device 310, terminal devices 320, and kiosk terminals 370.

The server device 310 may be installed in any location. The server device 310 is installed in a data center, in the present embodiment. The server device 310 is a computer. The server device 310 sequentially inputs orders from the kiosk terminals 370 and pre-orders from the terminal devices 320 into order queues 410 by order type. The server device 310 sequentially reads orders from the order queues 410. The server device 310 executes, for respective read orders, transmission processes 420 by order type, to call an API 430 of a control apparatus 120 through a network 330 such as the Internet.

The terminal devices 320 are used by users 220. The terminal devices 320 are, for example, mobile devices such as smartphones or tablets, or PCs.

The kiosk terminals 370 may be installed in any location. The kiosk terminals 370 are installed in a store 230 or in the vicinity of the store 230, in the present embodiment. The kiosk terminals 370 each include an input apparatus 150 such as a touch screen integrally provided with a display, and an output apparatus 160 such as a display.

Processes executed in the article management system 100 according to the present embodiment will be described with reference to FIG. 18.

The flow of processes regarding an order from a kiosk terminal 370 will be described. This flow includes steps corresponding to steps S101 to S105 of FIG. 7. Descriptions of portions common to the processes of steps of FIG. 7 are omitted or simplified as appropriate.

In a step corresponding to step S101 of FIG. 7, a controller 121 of the control apparatus 120 searches a database 140 to generate a list 250 of the types of articles 200 contained in a plurality of containers 210 stored in an automated storage and retrieval system 110. The controller 121 causes the output apparatus 160 of the kiosk terminal 370 to output the generated list 250 via a communication interface 123 or an output interface 125. That is, the kiosk terminal 370 is controlled to output, to a user 220, the list 250 of the types of the articles 200 contained in the plurality of containers 210 stored in the automated storage and retrieval system 110. For example, a display of the kiosk terminal 370 displays the list 250 on screen.

In a step corresponding to step S102 of FIG. 7, the input apparatus 150 of the kiosk terminal 370 accepts an order operation for at least one article 201 by the user 220. The order operation includes a first operation in which the user 220 selects the at least one article 201 and a second operation in which the user 220 confirms purchase of the at least one article 201. The kiosk terminal 370 accepts, as the first operation, an operation in which the user 220 selects the at least one article 201 from the list 250 outputted by the kiosk terminal 370. In the present embodiment, the first operation is an operation in which the user 220 adds the at least one article 201 to a virtual shopping cart. For example, a touch screen of the kiosk terminal 370 accepts an operation in which the user 220 adds, to the shopping cart, a product that the user 220 desires to purchase on a page displayed by the display. The kiosk terminal 370 accepts, as the second operation, an operation in which the user 220 confirms purchase of the product added to the shopping cart, such as an operation to pay for the product. In the present embodiment, the second operation is an operation in which the user 220 makes a payment for the at least one article 201. For example, the touch screen of the kiosk terminal 370 accepts an operation to make a payment by cash, credit card, electronic money, points, or virtual currency via a payment system such as a POS system installed in the store 230.

In a step corresponding to step S103 of FIG. 7, each time the first operation is accepted at the kiosk terminal 370, the server device 310 receives, through the network 330, information on the article 201 selected by the first operation. The server device 310 inputs the received information into order queue A as a kiosk order. Each time the server device 310 reads a kiosk order from order queue A, the server device 310 executes transmission process A to call retrieve_tote_by_order_line of the API 430 through the network 330. When retrieve_tote_by_order_line is called, the controller 121 of the control apparatus 120 searches the database 140 to identify a container 211 containing the article 201 selected by the first operation. The controller 121 causes the automated storage and retrieval system 110 to retrieve the identified container 211 from a corresponding storage position via the communication interface 123. That is, the automated storage and retrieval system 110 is controlled to retrieve, from a corresponding storage position in a rack 111 using a crane 112, the container 211 containing the at least one article 201, which is to be picked up at a pick-up area 103, among the plurality of containers 210 stored in the automated storage and retrieval system 110, in response to the first operation accepted at the kiosk terminal 370.

When the second operation is accepted at the kiosk terminal 370, the server device 310 receives information on the article 201 purchased by the second operation through the network 330. The server device 310 inputs the received information into order queue B as a kiosk order for which a payment is completed. In a case in which a kiosk order inputted into order queue A at the time of selection, by the first operation, of the article 201 purchased by the second operation has not been read from order queue A and is still in order queue A, the server device 310 deletes the kiosk order from order queue A. That is, in a case in which a payment for a kiosk order corresponding to the first operation is completed by the second operation before the kiosk order is read from order queue A, the server device 310 practically moves the kiosk order from order queue A to order queue B as a kiosk order for which a payment is completed. On the other hand, in a case in which a payment for a kiosk order corresponding to the first operation is completed by the second operation after the kiosk order is read from order queue A, the server device 310 simply inputs a kiosk order for which a payment is completed into order queue B. In a case in which there is a kiosk order for which a payment is completed by the second operation without going through the first operation, such as in a case in which a product is purchased with a single click, the server device 310 also inputs the kiosk order for which a payment is completed into order queue B. Each time the server device 310 reads a kiosk order for which a payment is completed from order queue B, the server device 310 executes transmission process B to call retrieve_tote_and_picking of the API 430 through the network 330. When retrieve_tote_and_picking is called, the controller 121 of the control apparatus 120 searches the database 140 to identify the container 211 containing the article 201 purchased by the second operation. In a case in which the identified container 211 has not yet been retrieved from the storage position, the controller 121 causes the automated storage and retrieval system 110 to retrieve the identified container 211 from the storage position via the communication interface 123. That is, the automated storage and retrieval system 110 is controlled to retrieve, from the storage position in the rack 111 using the crane 112, the container 211 containing the at least one article 201, which is to be picked up at the pick-up area 103, among the plurality of containers 210 stored in the automated storage and retrieval system 110, in response to the second operation accepted at the kiosk terminal 370.

In a step corresponding to step S104 of FIG. 7, the controller 121 of the control apparatus 120 controls picking by a manipulator 130, via the communication interface 123. That is, the manipulator 130 is controlled to perform the picking.

In a step corresponding to step S105 of FIG. 7, the controller 121 of the control apparatus 120 causes, via the communication interface 123, a conveyor 170 to feed the at least one article 201 picked by the picking, into a pick-up box 180, which is to be used by the user 220 to pick up the article 201 at the pick-up area 103. That is, the conveyor 170 is controlled to transport, to the pick-up area 103, the at least one article 201 picked by the picking.

The flow of processes regarding a pre-order from a terminal device 320 will be described. This flow includes steps corresponding to step S201 of FIG. 9, step S202 of FIG. 9, step S401 of FIG. 15, step S402 of FIG. 15, step S104 of FIG. 7, and step S105 of FIG. 7. Descriptions of portions common to the processes of steps of FIGS. 7, 9, and 15 are omitted or simplified as appropriate.

The terminal device 320 transmits order information 260 for at least one article 201 to the server device 310 through the network 330 when a user 220 orders the article 201 at an e-commerce site. The order information 260 includes identification information such as a barcode, a two-dimensional code, or an RFID attached to the article 201 that the user 220 has ordered at the e-commerce site, or an image of the article 201.

In a step corresponding to step S201 of FIG. 9, the server device 310 receives the order information 260 through the network 330 when the order information 260 is transmitted from the terminal device 320. In a step corresponding to step S202 of FIG. 9, the server device 310 inputs the received order information 260 into order queue C as a pre-order. The server device 310 holds the order information 260 in association with authentication information 271 such as a claim reference number. The authentication information 271 may be provided from the e-commerce site as part of the order information 260. Alternatively, the authentication information 271 may be newly generated by the server device 310 and the user 220 may be informed of the authentication information 271 through the network 330. The authentication information 271 may be in any format. In the present embodiment, the authentication information 271 is a two-dimensional code. Each time the server device 310 reads a pre-order from order queue C, the server device 310 executes transmission process C to call retrieve_tote of the API 430 through the network 330. When retrieve_tote is called, the controller 121 of the control apparatus 120 searches the database 140 to identify a container 211 containing the article 201 corresponding to the order information 260. The controller 121 causes the automated storage and retrieval system 110 to retrieve the identified container 211 from a corresponding storage position via the communication interface 123. That is, the automated storage and retrieval system 110 is controlled to retrieve, from a corresponding storage position in the rack 111 using the crane 112, the container 211 containing the at least one article 201, which is to be picked up at the pick-up area 103, among the plurality of containers 210 stored in the automated storage and retrieval system 110, in response to the order information 260 transmitted from the terminal device 320.

Figure 15:
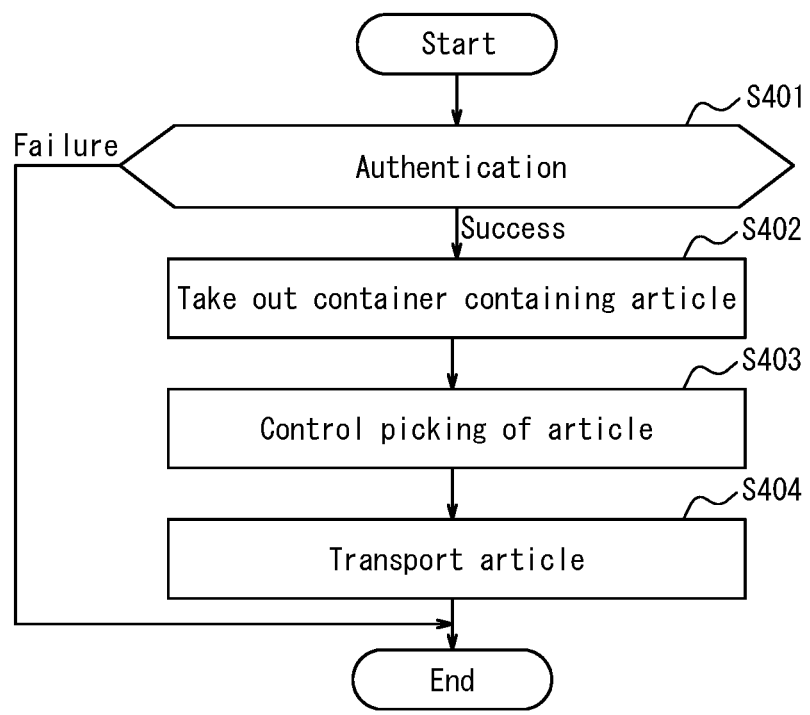
FIG. 15 is a flowchart illustrating operations of the article management system according to the fourth embodiment.

In a step corresponding to step S401 of FIG. 15, the input apparatus 150 of a kiosk terminal 370 receives an input operation, by the user 220, of authentication information 270 for picking up the at least one article 201 when the user 220 visits the store 230. For example, a touch screen of the kiosk terminal 370 accepts an operation in which the user 220 inputs a two-dimensional code, of which the user 220 has been informed through the network 330 from the e-commerce site or the server device 310.

When the input operation is accepted at the kiosk terminal 370, the server device 310 receives the authentication information 270 through the network 330. The server device 310 checks the received authentication information 270 against valid authentication information 271. In a case in which the authentication succeeds, namely, in a case in which the authentication information 270 is identical to the valid authentication information 271, the server device 310 inputs the order information 260 associated with the authentication information 271 into order queue B as a pre-order for which authentication is completed. In a step corresponding to step S402 of FIG. 15, each time the server device 310 reads a pre-order for which authentication is completed from order queue B, the server device 310 executes transmission process B to call retrieve_tote_and_picking of the API 430 through the network 330. When retrieve_tote_and_picking is called, the controller 121 of the control apparatus 120 searches the database 140 to identify the container 211 containing the article 201, which is associated with the authentication information 270. In a case in which the identified container 211 has not yet been retrieved from the storage position, the controller 121 causes the automated storage and retrieval system 110 to retrieve the identified container 211 from the storage position via the communication interface 123. That is, the automated storage and retrieval system 110 is controlled to retrieve, from the storage position in the rack 111 using the crane 112, the container 211 containing the at least one article 201, which is to be picked up at the pick-up area 103, among the plurality of containers 210 stored in the automated storage and retrieval system 110, in response to the order information 260 transmitted from the terminal device 320.

In a step corresponding to step S104 of FIG. 7, the controller 121 of the control apparatus 120 controls picking by the manipulator 130, via the communication interface 123. That is, the manipulator 130 is controlled to perform the picking.

In a step corresponding to step S105 of FIG. 7, the controller 121 of the control apparatus 120 causes, via the communication interface 123, the conveyor 170 to feed the at least one article 201 picked by the picking, into the pick-up box 180, which is to be used by the user 220 to pick up the article 201 at the pick-up area 103. That is, the conveyor 170 is controlled to transport, to the pick-up area 103, the at least one article 201 picked by the picking.

As described above, in the present embodiment, the controller 121 of the control apparatus 120 executes a process for causing the automated storage and retrieval system 110 to take out a container 211 containing at least one article 201 to a picking area 102 in response to each of an order operation for the at least one article 201 by a user 220 and order information 260 for the at least one article 201 transmitted through the network 330. In a case in which while the order operation is carried out by one user 220, the order information 260 from another user 220 is transmitted, the controller 121 executes the process giving priority to the user 220 carrying out the order operation. For example, the server device 310 may execute transmission process C only when transmission process A and transmission process B are not in execution. Transmission process A is regarded as in execution after retrieve_tote_by_order_line of the API 430 is called and until accept is received as a response. Transmission process B is regarded as in execution after retrieve_tote_and_picking of the API 430 is called and until not only accept is received as a response but also every applicable container 211 is taken out to the picking area 102. Transmission process C is regarded as in execution after retrieve_tote of the API 430 is called and until not only accept is received as a response but also every applicable container 211 is retrieved from a corresponding storage position.

According to the present embodiment, unoccupied time not used for processing kiosk orders can be used for processing pre-orders to improve the efficiency of processing orders.

As a variation of the present embodiment, how many orders in each of order queue A, order queue B, and order queue C can be transmitted in an overlapping manner may be controlled. For example, the server device 310 may limit the number of transmission processes A that can be executed in an overlapping manner to three. The server device 310 may limit the number of transmission processes B that can be executed in an overlapping manner to two. The server device 310 may execute transmission process C one at a time.

As a variation of the present embodiment, how many orders in order queue A, order queue B, and order queue C can be transmitted in total in an overlapping manner may be controlled. For example, the server device 310 may limit the total number of transmission processes 420 that can be executed simultaneously to four. By enabling the definition of the maximum overall overlapping degree, capacity overload and queue stagnation can be prevented.

As a further variation, the overlapping degree may be changed dynamically according to the situation. Queues similar to the order queues 410 and parallelizable transmission processes similar to the transmission processes 420 may also be provided for various instructions such as instructions for bringing in products and instructions for taking out delivery products of an e-commerce site. By dynamically changing the overlapping degree of the transmission processes for various processing requests, the processes can be executed with the optimal priority according to the situation. For example, in a case in which the number of kiosk orders and pre-orders is low, a large number of instructions for bringing in products can be processed.

As a variation of the present embodiment, the order of orders may be interchangeable in each of order queue A, order queue B, and order queue C.

As a variation of the present embodiment, instead of orders being processed by calling the API 430 through the network 330, orders may be processed by another communication method such as MQ. The term "MQ" is an abbreviation of message queuing.

As a variation of the present embodiment, the server device 310 may be integrated into the control apparatus 120.

Seventh Embodiment

Figure 19:
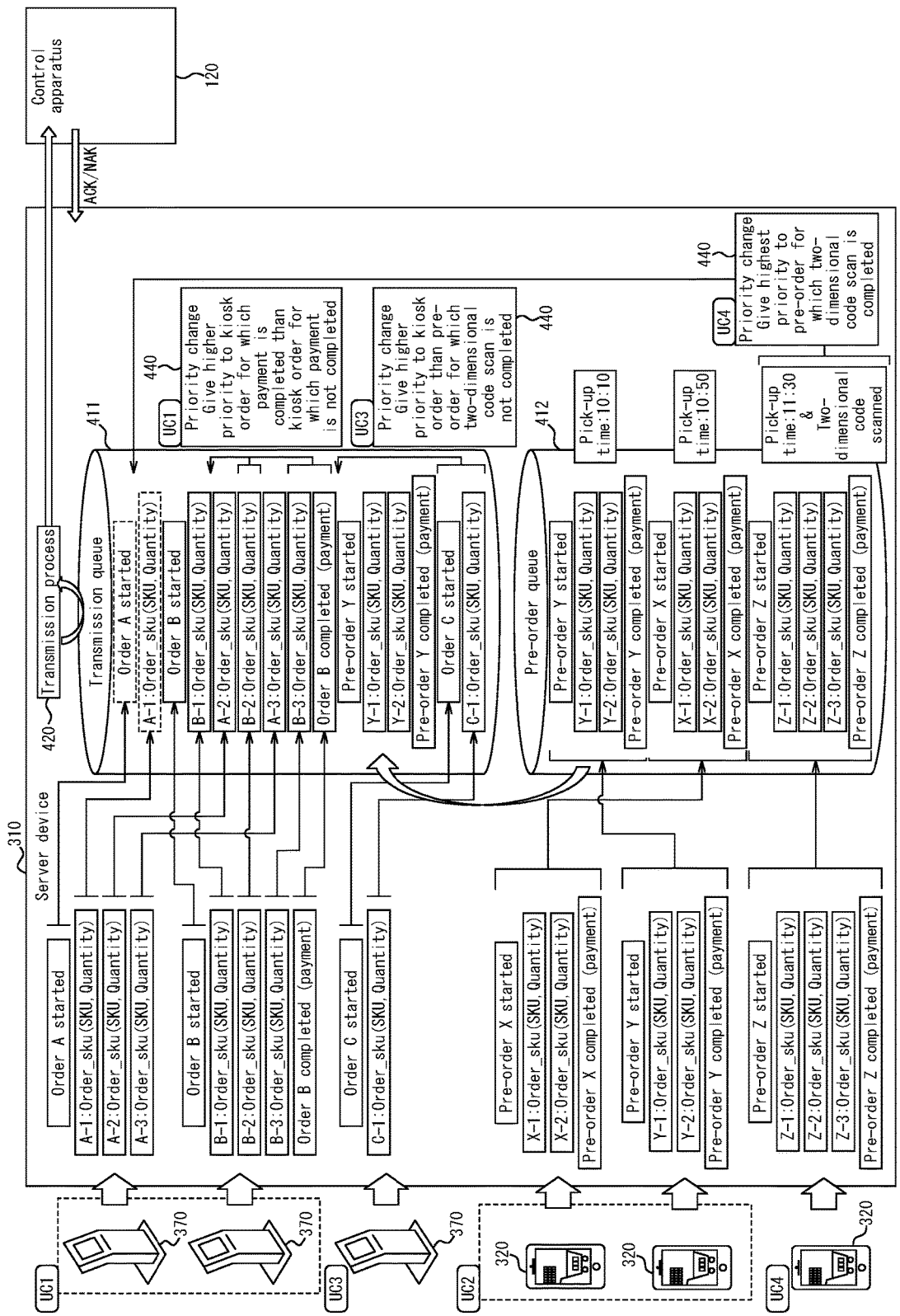
FIG. 19 is a diagram illustrating processes executed in an article management system according to a seventh embodiment.

Processes executed in the article management system 100 according to the present embodiment will be described with reference to FIG. 19. Descriptions of portions common to the processes executed in the article management system 100 according to the sixth embodiment are omitted.

The flow of processes regarding an order from a kiosk terminal 370 will be described.

In a step corresponding to step S103 of FIG. 7, each time a first operation is accepted at the kiosk terminal 370, a server device 310 receives, through a network 330, information on an article 201 selected by the first operation. The server device 310 inputs the received information into a transmission queue 411 as a kiosk order. Each time the server device 310 reads a kiosk order from the transmission queue 411, the server device 310 executes a transmission process 420 to call retrieve_tote_by_order_line of an API 430 of a control apparatus 120 through the network 330. The process executed by the control apparatus 120 when retrieve_tote_by_order_line is called is equivalent to that of the sixth embodiment, and thus descriptions thereof are omitted.

When a second operation is accepted at the kiosk terminal 370, the server device 310 receives information on the article 201, which is purchased by the second operation, through the network 330. The server device 310 inputs the received information into the transmission queue 411 as a kiosk order for which a payment is completed. Each time the server device 310 reads a kiosk order for which a payment is completed from the transmission queue 411, the server device 310 executes the transmission process 420 to call retrieve_tote_and_picking of the API 430 through the network 330. The process executed by the control apparatus 120 when retrieve_tote_and_picking is called is equivalent to that of the sixth embodiment, and thus descriptions thereof are omitted.

In the present embodiment, the server device 310 executes priority changes 440 to give higher priority to kiosk orders for which payments are completed than kiosk orders for which payments are not completed. For example, in a case in which there is kiosk order A not yet transmitted, for which a payment is not completed and that has been inputted into the transmission queue 411 prior to kiosk order B for which a payment is completed, the server device 310 moves kiosk order B closer to the head of the transmission queue 411 than kiosk order A.

The flow of processes regarding a pre-order from a terminal device 320 will be described.

In a step corresponding to step S201 of FIG. 9, the server device 310 receives order information 260 through the network 330 when the order information 260 is transmitted from the terminal device 320. The order information 260 includes information on a pick-up time, which is the time at which the user 220 is to pick up, at a store 230, an article 201 ordered at an e-commerce site. In a step corresponding to step S202 of FIG. 9, the server device 310 inputs the received order information 260 into a pre-order queue 412 as a pre-order. The server device 310 holds the order information 260 in association with authentication information 271 such as a claim reference number. The server device 310 reads pre-orders from the pre-order queue 412 in the order of the earliest pick-up time, and inputs the read pre-orders into the transmission queue 411. Each time the server device 310 reads a pre-order from the transmission queue 411, the server device 310 executes the transmission process 420 to call retrieve_tote of the API 430 through the network 330. The process executed by the control apparatus 120 when retrieve_tote is called is equivalent to that of the sixth embodiment, and thus descriptions thereof are omitted.

When an input operation is accepted at a kiosk terminal 370, the server device 310 receives authentication information 270 through the network 330. The server device 310 checks the received authentication information 270 against valid authentication information 271. In a case in which the authentication succeeds, namely, in a case in which the authentication information 270 is identical to the valid authentication information 271, the server device 310 reads, if a pre-order associated with the authentication information 271 has not yet been inputted into the transmission queue 411, the pre-order from the pre-order queue 412 regardless of the pick-up time, and input the read pre-order into the transmission queue 411 as an pre-order for which authentication is completed. In a step corresponding to step S402 of FIG. 15, each time the server device 310 reads a pre-order for which authentication is completed from the transmission queue 411, the server device 310 executes the transmission process 420 to call retrieve_tote_and_picking of the API 430 through the network 330.

In the present embodiment, the server device 310 executes priority changes 440 to give higher priority to kiosk orders than pre-orders for which authentication is not completed. For example, in a case in which there is pre-order Y not yet transmitted, for which authentication is not completed and that has been inputted into the transmission queue 411 prior to kiosk order C, the server device 310 moves kiosk order C closer to the head of the transmission queue 411 than pre-order Y.

In the present embodiment, the server device 310 executes priority changes 440 to give the highest priority to pre-orders for which authentication is completed. For example, in a case in which there are one or more orders not yet transmitted, that have been inputted into the transmission queue 411 prior to pre-order Z for which authentication is completed, the server device 310 moves pre-order Z to the head of the transmission queue 411.

According to the present embodiment, priority can be given to processing orders for which pick-up finishes early to reduce the waiting time when users 220 visit the store 230.

As a variation of the present embodiment, in a case in which the number of times that a kiosk order has been overtaken in the transmission queue 411 by pre-orders for which authentication is completed exceeds a certain number of times, the kiosk order may be processed with a higher priority.

Eighth Embodiment

A configuration of an article management system 100 according to the present embodiment will be described with reference to FIG. 20. Descriptions of portions common to the configuration of the article management system 100 according to the first embodiment are omitted.

The article management system 100 includes a conveyor 173, which is separate from a conveyor 170, and pick-up terminals 380.

The conveyor 170 may have only a single lane. In the present embodiment, the conveyor 170 has a first lane 171 and a second lane 172. The conveyor 170 is driven independently lane by lane.

The conveyor 173 is installed below the conveyor 170 in the present embodiment. Alternatively, the conveyor 173 may be installed above the conveyor 170. The conveyor 173 is, for example, a belt conveyor, a chain conveyor, a conveyor applying an omni-wheel, a bot-type transfer device, or any combination thereof. The conveyor 173 may have only a single lane. In the present embodiment, the conveyor 173 has a third lane 174 and a fourth lane 175. The conveyor 173 is driven independently lane by lane.

The pick-up terminals 380 are installed in a pick-up area 103. The pick-up terminals 380 each include an input apparatus 150 such as a touch screen integrally provided with a display, an output apparatus 160 such as a display, and a pick-up box 180 that can be opened and closed automatically or manually.

An automated storage and retrieval system 110 is a rotary shelf type AS/RS in the present embodiment. The automated storage and retrieval system 110 includes a plurality of racks 116, each rack 116 being a vertically rotating rack that rotates independently.

The number of racks 116 may be any number of two or more. In the example of FIG. 20, the number of racks 116 is five on the right and five on the left, for a total of ten. Each rack 116 may be configured to store any number of containers 210. In the example of FIG. 20, each rack 116 is configured to store eleven containers 210 in the vertical direction, one container 210 in the horizontal direction, and two containers 210 in the depth direction. Each rack 116 is provided with two openings, a take-out opening for ejecting containers 210 and a return opening for inserting containers 210.

In addition to the racks 116, the automated storage and retrieval system 110 includes a first conveyor 113, a second conveyor 114, and a third conveyor 115.

The first conveyor 113 is installed adjacent to the racks 116. The first conveyor 113 is installed in line with, in the vertical directions of the racks 116, the positions of the take-out openings of the racks 116. The first conveyor 113 is, for example, a belt conveyor, a chain conveyor, a conveyor applying an omni-wheel, a bot-type transfer device, or any combination thereof.

The second conveyor 114 is installed adjacent to the first conveyor 113. The second conveyor 114 is, for example, a belt conveyor, a chain conveyor, a conveyor applying an omni-wheel, a bot-type transfer device, or any combination thereof. The second conveyor 114 may have only a single lane. In the present embodiment, the second conveyor 114 has a plurality of lanes. In the example of FIG. 20, the second conveyor 114 has two lanes. The second conveyor 114 is driven independently lane by lane.

The third conveyor 115 is installed below the first conveyor 113 and the second conveyor 114 and adjacent to the racks 116, in the present embodiment. Alternatively, the third conveyor 115 may be installed above the first conveyor 113 and the second conveyor 114 and adjacent to the racks 116. The third conveyor 115 is installed in line with, in the vertical directions of the racks 116, the positions of the return openings of the racks 116. The third conveyor 115 is, for example, a belt conveyor, a chain conveyor, a conveyor applying an omni-wheel, a bot-type transfer device, or any combination thereof.

Operations of the article management system 100 according to the present embodiment will be described with reference to FIG. 20. These operations correspond to an article management method according to the present embodiment. Descriptions of portions common to the operations of the article management system 100 according to the first embodiment are omitted or simplified as appropriate.

In a step corresponding to step S101 of FIG. 7, a controller 121 of a control apparatus 120 searches a database 140 to generate a list 250 of the types of articles 200 contained in a plurality of containers 210 stored in the automated storage and retrieval system 110. The controller 121 causes the output apparatus 160 of a pick-up terminal 380 to output the generated list 250 via an output interface 125. That is, the pick-up terminal 380 is controlled to output, to a user 220, the list 250 of the types of the articles 200 contained in the plurality of containers 210 stored in the automated storage and retrieval system 110. For example, a display of the pick-up terminal 380 displays the list 250 on screen.

In a step corresponding to step S102 of FIG. 7, the input apparatus 150 of the pick-up terminal 380 accepts an order operation for at least one article 201 by the user 220. The order operation includes a first operation in which the user 220 selects the at least one article 201 and a second operation in which the user 220 confirms purchase of the at least one article 201. The pick-up terminal 380 accepts, as the first operation, an operation in which the user 220 selects the at least one article 201 from the list 250 outputted by the pick-up terminal 380. In the present embodiment, the first operation is an operation in which the user 220 adds the at least one article 201 to a virtual shopping cart. For example, a touch screen of the pick-up terminal 380 accepts an operation in which the user 220 adds, to the shopping cart, a product that the user 220 desires to purchase on a page displayed by the display. The pick-up terminal 380 accepts, as the second operation, an operation in which the user 220 confirms purchase of the product added to the shopping cart, such as an operation to pay for the product. In the present embodiment, the second operation is an operation in which the user 220 makes a payment for the at least one article 201. For example, the touch screen of the pick-up terminal 380 accepts an operation to make a payment by cash, credit card, electronic money, points, or virtual currency via a payment system such as a POS system installed in a store 230.

In a step corresponding to step S103 of FIG. 7, the controller 121 of the control apparatus 120 moves, in response to the first operation, a container 211 containing the at least one article 201 among the plurality of containers 210, each container 210 containing one or more articles 200, from a corresponding rack 116 to the first conveyor 113 as a container 212 containing the article 201 selected by the first operation.

Specifically, the controller 121 of the control apparatus 120 identifies the article 201 selected by the first operation accepted at the pick-up terminal 380 via an input interface 124. The controller 121 searches the database 140 to identify the container 212 containing the identified article 201. The controller 121 causes the automated storage and retrieval system 110 to retrieve the identified container 212 from a corresponding rack 116 via a communication interface 123. That is, in response to the first operation accepted at the pick-up terminal 380, the automated storage and retrieval system 110 is controlled to rotate a rack 116 storing the container 212 containing the article 201 selected by the first operation and then eject the container 212 from the take-out opening of the rack 116 to the first conveyor 113. The controller 121 stores, in a memory 122, information indicating the position of the container 212 on the first conveyor 113.

The controller 121 of the control apparatus 120 moves, in response to the second operation, the container 211 containing the article 201, purchase of which is confirmed by the second operation, from the first conveyor 113 to the second conveyor 114.

Specifically, the controller 121 of the control apparatus 120 identifies the article 201, purchase of which is confirmed by the second operation accepted at the pick-up terminal 380, via the input interface 124. The controller 121 identifies the position, on the first conveyor 113, of the container 211 containing the identified article 201 with reference to the information stored in the memory 122. The controller 121 causes, via the communication interface 123, the automated storage and retrieval system 110 to move the container 211 at the identified position from the first conveyor 113 to the second conveyor 114. That is, in response to the second operation accepted at the pick-up terminal 380, the automated storage and retrieval system 110 is controlled to move the container 211 containing the article 201, purchase of which is confirmed by the second operation, from the first conveyor 113 to the second conveyor 114.

The controller 121 of the control apparatus 120 drives the second conveyor 114 to bring the container 211 containing the article 201, purchase of which is confirmed, to a position where picking is to be performed.

Specifically, the controller 121 of the control apparatus 120 drives the second conveyor 114 independently lane by lane to bring the container 211 containing the article 201, purchase of which is confirmed, to the position where the picking is to be performed. That is, the second conveyor 114 is driven independently lane by lane and controlled to bring the container 211 containing the article 201, purchase of which is confirmed, to the position where the picking is to be performed.

In the present embodiment, in a case in which multiple users 220 carry out order operations in parallel, the controller 121 of the control apparatus 120 moves, in response to the first operation by each of the multiple users 220, a container 212 containing an article 201 selected by each user 220 among the plurality of containers 210 from a corresponding rack 116 to a position corresponding to each user 220 on the first conveyor 113. In a case in which a first user among the multiple users 220 has carried out the second operation prior to a second user, the controller 121 moves the container 212 containing the article 201 selected by the first user to the second conveyor 114 prior to the container 212 containing the article 201 selected by the second user.

In the present embodiment, the controller 121 of the control apparatus 120 drives the second conveyor 114 in a direction orthogonal to the driving direction of the first conveyor 113. In the example of FIG. 20, the controller 121 drives the first conveyor 113 in the forward direction when moving a container 211 from the first conveyor 113 to the second conveyor 114. The controller 121 also drives the second conveyor 114 in the forward direction in a case in which the container 211 is moved to the front lane of the second conveyor 114. Whether the container 211 is moved to the front or rear lane of the second conveyor 114 may be determined by any method such as round robin. In the example of FIG. 20, the controller 121 drives the second conveyor 114 in the right direction when bringing the container 211 to a position where picking is to be performed.

In the present embodiment, in a case in which a user 220 has carried out a third operation to deselect at least one article 201, the controller 121 of the control apparatus 120 returns, in response to the third operation, the container 212 containing the article 201 from the first conveyor 113 to a rack 116. Specifically, the controller 121 drives the first conveyor 113 to return the container 212 to the rack 116 in response to the third operation. That is, in response to the third operation accepted at the pick-up terminal 380, the automated storage and retrieval system 110 is controlled to insert the container 212 containing the article 201 deselected by the third operation from the first conveyor 113 to the return opening of the rack 116. In the present embodiment, the third operation is an operation in which the user 220 removes the at least one article 201 from the virtual shopping cart. In the example of FIG. 20, the controller 121 drives the first conveyor 113 in the rearward direction when returning the container 212 from the first conveyor 113 to the rack 116.

In a step corresponding to step S104 of FIG. 7, the controller 121 of the control apparatus 120 controls picking by a manipulator 130, via the communication interface 123. That is, the manipulator 130 is controlled to perform the picking. In the present embodiment, during the picking, at least one article 201 is picked out of a container 211 taken out by the automated storage and retrieval system 110, at a picking area 102, and the picked article 201 is transferred to another container 215.

The controller 121 of the control apparatus 120 causes the third conveyor 115 to return, after the picking is performed, the container 211 that has been containing the at least one article 201 to a storage position. That is, the third conveyor 115 is controlled to return, after the picking is performed, the container 211 that has been containing the at least one article 201 to the storage position.

Specifically, the controller 121 of the control apparatus 120 moves the container 211, out of which the at least one article 201 has been picked by the picking, from the second conveyor 114 to the third conveyor 115 as a container 214 for which picking is completed. The controller 121 drives the third conveyor 115 to return the container 214 to a rack 116. That is, the automated storage and retrieval system 110 is controlled to insert the container 214 for which picking is completed from the third conveyor 115 into the return opening of the rack 116. In the example of FIG. 20, the controller 121 drives the third conveyor 115 in the rearward direction or in the leftward and rearward directions when returning the container 214 from the third conveyor 115 to the rack 116.

In a step corresponding to step S105 of FIG. 7, the controller 121 of the control apparatus 120 causes, via the communication interface 123, the conveyor 170 to feed the at least one article 201 picked by the picking, into the pick-up box 180 of the pick-up terminal 380. That is, the conveyor 170 is controlled to transport, to the pick-up area 103, the at least one article 201 picked by the picking.

Specifically, the controller 121 of the control apparatus 120 drives each lane of the conveyor 170 as appropriate to feed the container 215 in which the at least one article 201 is placed by the picking, into the pick-up box 180 of the pick-up terminal 380. As a method for feeding the container 215, any method may be used. One possible method in the present embodiment includes moving the container 215 from the conveyor 170 into the pick-up box 180 through an opening provided at the rear of the pick-up box 180.

Figure 20:
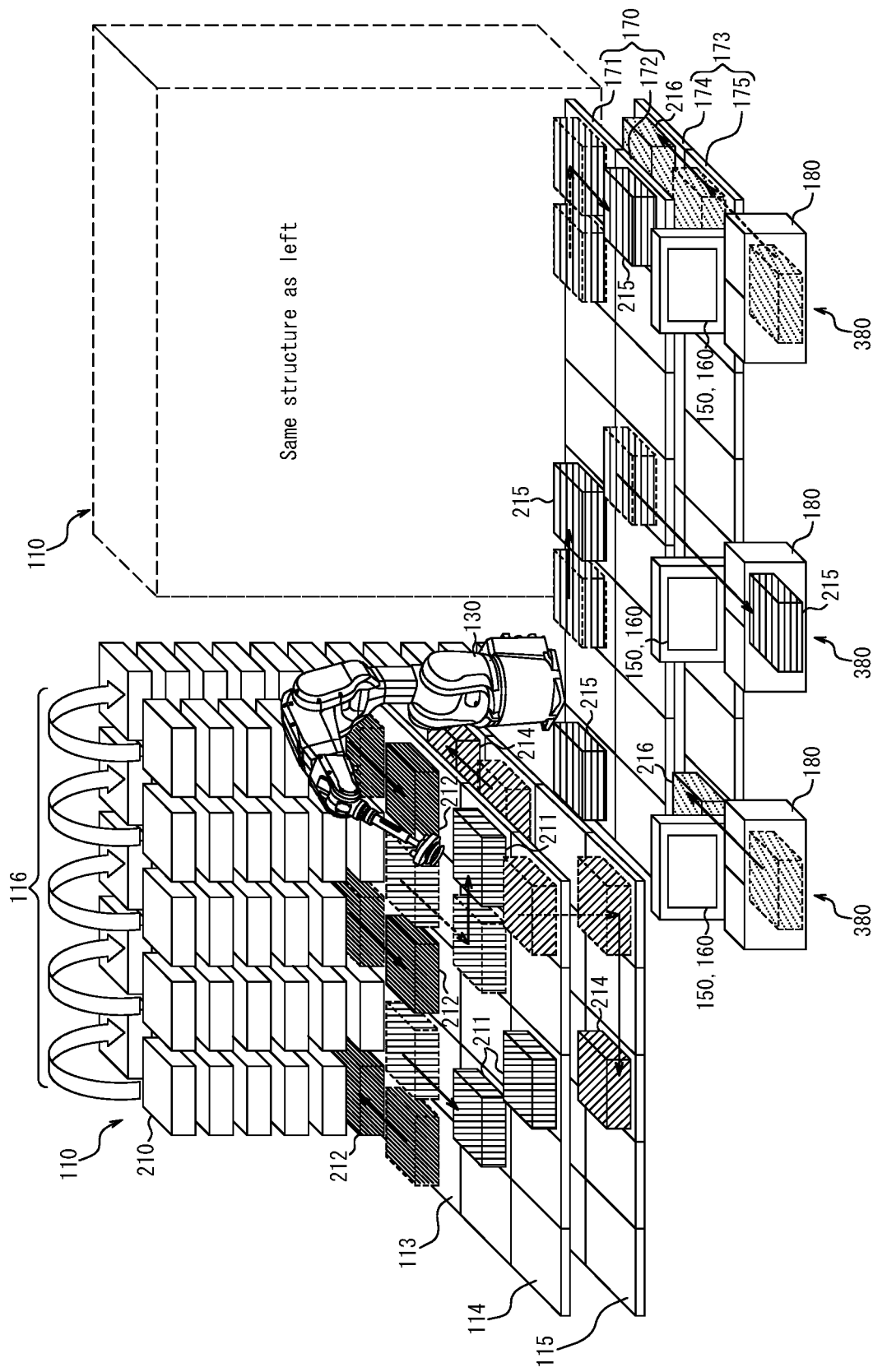
FIG. 20 is a diagram illustrating a partial configuration of an article management system according to an eighth embodiment.

In the example of FIG. 20, the controller 121 of the control apparatus 120 drives the first lane 171 of the conveyor 170 in the right direction to bring the container 215 in which the at least one article 201 is placed by the picking, to a position corresponding to the pick-up terminal 380. The controller 121 drives the first lane 171 in the forward direction to move the container 215 to the second lane 172 of the conveyor 170. The controller 121 drives the second lane 172 in the forward direction to feed the container 215 into the pick-up box 180 of the pick-up terminal 380.

The controller 121 of the control apparatus 120 causes the conveyor 173 to return, after the article 201 is picked up at the pick-up area 103, the container 215 in which the at least one article 201 has been placed by the picking, to the picking area 102. That is, the conveyor 173 is controlled to return, after the article 201 is picked up at the pick-up area 103, the container 215 in which the at least one article 201 has been placed by the picking, to the picking area 102.

Specifically, the controller 121 of the control apparatus 120 moves the container 215, out of which the at least one article 201 has been picked by the user 220, from the pick-up box 180 to the conveyor 173 as a container 216 for which pick-up is completed. As a method for moving the container 216 to the conveyor 173, any method may be used. One possible method in the present embodiment includes tilting to the rear a plate that is provided in the pick-up box 180 and is adjustable in angle, and sliding the container 216 from the pick-up box 180 to the conveyor 173 through an opening provided at the rear of the pick-up box 180. The controller 121 drives the conveyor 173 to return the container 216 to its original position. The original position is a position where the container 216, which is empty, is held until it is used again as a container 215 for picking.

In the example of FIG. 20, the controller 121 of the control apparatus 120 drives the fourth lane 175 of the conveyor 173 in the rearward direction to move the container 216, which is empty, to the third lane 174 of the conveyor 173. The controller 121 drives the third lane 174 in the left direction to return the container 216 to its original position.

As described above, in the present embodiment, the plurality of racks 116, which stores a plurality of containers 210, is vertically rotating racks, and each rack 116 rotates independently. Therefore, parallel processes can be executed for the number of racks 116. In the example of FIG. 20, up to 10 processes can be executed in parallel.

In the first embodiment, the cycle time can be reduced by increasing the moving speed of a crane 112. In the present embodiment, the cycle time can also be reduced by increasing the rotating speed of each rack 116. The cycle time does not deteriorate even if the speed is lowered than the crane 112. Thus, the possibility of damaging products can be reduced.

In the present embodiment, the automated storage and retrieval system 110 stores a plurality of brought-in containers 210 separately in two or more compartments having temperature settings different from each other, according to the types of articles 200 contained in each container 210, in the same manner as the first embodiment. For example, ten racks 116 are as a whole divided into four compartments corresponding to four respective temperature ranges, which are frozen, chilled, constant, and ambient, and the plurality of brought-in containers 210 is stored separately in the four compartments according to the types of the articles 200 contained in each container 210. Separating temperature ranges for each rack 116 makes it easier to manage the temperature ranges. Limiting the openings of each rack 116 to only two, the take-out and return openings, makes it even easier to manage the temperature ranges. Either or both of the take-out and return openings may be configured to be openable and closable.

In the present embodiment, the first conveyor 113 adjacent to the racks 116, which stores a plurality of containers 210, each container 210 containing one or more articles 200, receives a container 211 containing at least one article 201 among the plurality of containers 210 from a rack 116, in response to a first operation in which a user 220 selects the at least one article 201. The second conveyor 114 adjacent to the first conveyor 113 receives the container 211 containing the at least one article 201 from the first conveyor 113, in response to a second operation in which the user 220 confirms purchase of the at least one article 201. Then, the second conveyor 114 transports the container 211 containing the at least one article 201 to a position where picking the at least one article 201 is to be performed.

Therefore, according to the present embodiment, the retrieval of the container 211 from the rack 116 can be executed before the purchase of the article 201 is confirmed. In addition, even if an order overtaking occurs in which the purchase of the article 201 is confirmed first in an order operation started later, the picking of the article 201 can be performed first. Thus, the time between ordering and picking can be reduced.

In the present embodiment, the second conveyor 114 is driven independently lane by lane to bring the container 211 containing the article 201, purchase of which is confirmed, to the position where the picking is to be performed. The third conveyor 115 returns the container 211 to a storage position after the picking is performed.

Therefore, according to the present embodiment, while picking is being performed on one lane of the second conveyor 114, on another lane a container 214 for which picking has already been performed can be removed and a container 211 for which picking is to be performed next can be brought to a picking position.

As a variation of the present embodiment, instead of the pick-up terminals 380, kiosk terminals may each output a list 250 of the types of the articles 200 contained in the plurality of containers 210 stored in the automated storage and retrieval system 110. In that case, the kiosk terminals accept order operations. For example, in a case in which there is a plurality of kiosk terminals and a product is put into a shopping cart at one of the kiosk terminals, a tote containing the product is retrieved from a corresponding rack 116 and placed on the first conveyor 113. It is always managed at which position on the first conveyor 113 is a tote corresponding to which kiosk terminal or to an order from which user 220. Assuming that a payment is completed at one of the kiosk terminals, a tote in a position corresponding to the kiosk terminal is transferred from the first conveyor 113 onto the second conveyor 114. Then, the tote is carried by the second conveyor 114 to the vicinity of the manipulator 130 and picking is performed. According to this variation, even if a payment is completed at any of the kiosk terminals first, picking can be started immediately after the payment.

As a variation of the present embodiment, in a case in which a user 220 has carried out a third operation to deselect at least one article 201, the controller 121 of the control apparatus 120 may return a container 212 containing the article 201 from the first conveyor 113 via the third conveyor 115, instead of directly, to a rack 116. In that case, the controller 121 moves, in response to the third operation, the container 212 containing the article 201 deselected by the third operation from the first conveyor 113 to the third conveyor 115. The controller 121 drives the third conveyor 115 to return the container 212 to the rack 116. For example, the controller 121 drives the third conveyor 115 in the rearward direction when returning the container 212 from the third conveyor 115 to the rack 116.

As a variation of the present embodiment, the first conveyor 113, the second conveyor 114, and the third conveyor 115 may be extended to a space vacated by adopting a method in which an articulated robot of the manipulator 130 can be arranged in the air, such as ceiling suspended type. Alternatively, a sorting area may be placed in the vacated space to replace the first conveyor 113, the second conveyor 114, and the third conveyor 115.

As a variation of the present embodiment, the manipulator 130 may be movable. According to this variation, the flexibility around a picking area 102 is increased.

As a variation of the present embodiment, a small tote may be contained in a tote delivered from a distribution center, and the small tote may be stored in the automated storage and retrieval system 110.

As a variation of the present embodiment, five racks of the same structure may be installed across from the left five racks 116 illustrated in FIG. 20, for example, to share the first conveyor 113, the second conveyor 114, and the third conveyor 115.

Ninth Embodiment

A configuration of an article management system 100 according to the present embodiment will be described with reference to FIG. 21. Descriptions of portions common to the configuration of the article management system 100 according to the third embodiment are omitted.

The article management system 100 includes an automated storage and retrieval system 110, a conveyor 170, a conveyor 173, and pick-up terminals 380 that are equivalent to those of the article management system 100 according to the eighth embodiment.

A storage 190 includes one or more racks 191 and one or more cranes 192.

The number of racks 191 may be any number. In the example of FIG. 21, the number of racks 191 is one. The number of cranes 192 depends on the number of racks 191. In the example of FIG. 21, the number of cranes 192 is one. The crane 192 is installed in an aisle faced by the rack 191. In the example of FIG. 21, one crane 192 is installed in an aisle in front of one rack 191. This aisle may be so narrow that a person cannot walk therethrough, as long as its width is sufficient for installing the crane 192. The crane 192 is a mini-load crane in the present embodiment. Alternatively, the crane 192 may be, for example, a unit-load crane or a mid-load crane.

The storage 190 is installed closer to a pick-up area 103 than a plurality of racks 116 of the automated storage and retrieval system 110. At least a portion of the storage 190 is installed above a second conveyor 114 in the present embodiment. Alternatively, at least a portion of the storage 190 may be installed below the second conveyor 114. In the example of FIG. 21, the rack 191 of the storage 190 is installed above a first conveyor 113, which is adjacent to left five racks 116, and the second conveyor 114, which is adjacent to the first conveyor 113.

Operations of the article management system 100 according to the present embodiment will be described with reference to FIG. 21. These operations correspond to an article management method according to the present embodiment. Operations regarding an order from a pick-up terminal 380 or a kiosk terminal are equivalent to those of the article management system 100 according to the eighth embodiment, and thus descriptions thereof are omitted. Hereinafter, operations regarding a pre-order from a terminal device of a user 220 such as a smartphone will be described. Descriptions of portions common to the operations of the article management system 100 according to the third embodiment are omitted or simplified as appropriate.

Figure 13:
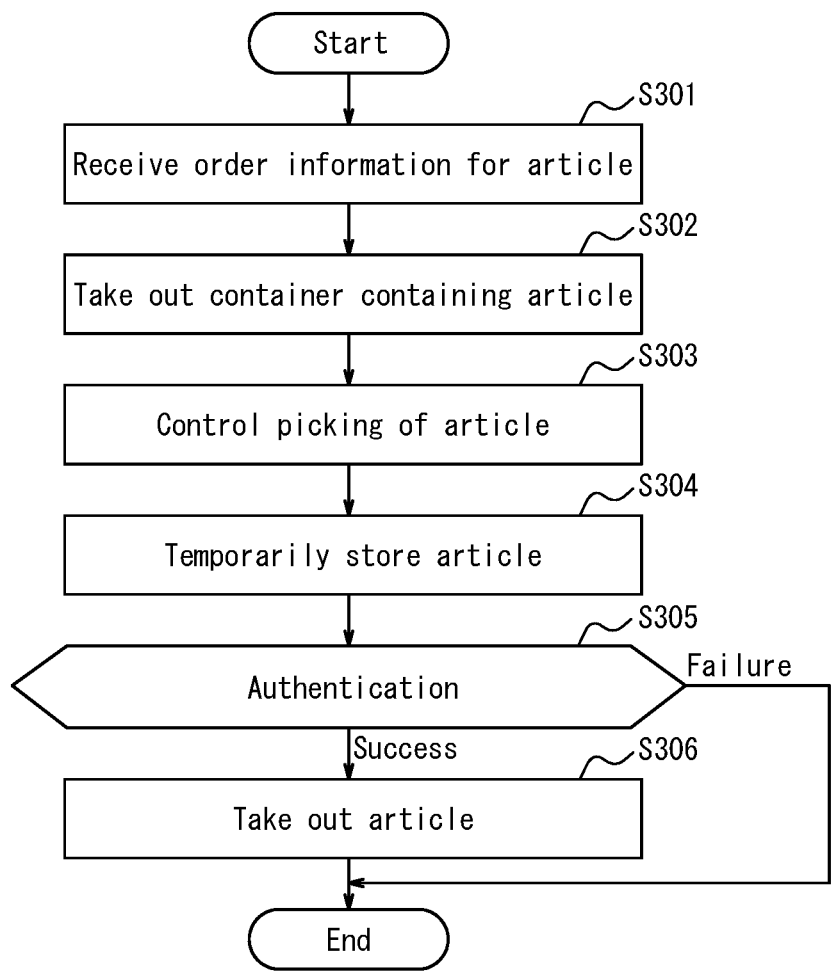
FIG. 13 is a flowchart illustrating operations of the article management system according to the third embodiment.

In a step corresponding to step S301 of FIG. 13, a controller 121 of a control apparatus 120 receives order information 260 for at least one article 201 transmitted through a network 330 such as the Internet, via a communication interface 123.

In a step corresponding to step S302 of FIG. 13, the controller 121 of the control apparatus 120 identifies the article 201, which is associated with the received order information 260. The controller 121 searches a database 140 to identify a container 211 containing the identified article 201. The controller 121 causes the automated storage and retrieval system 110 to retrieve the identified container 211 from a corresponding rack 116 via the communication interface 123. The controller 121 causes, via the communication interface 123, the automated storage and retrieval system 110 to move the container 211 from the first conveyor 113 to the second conveyor 114. The controller 121 drives the second conveyor 114 independently lane by lane to bring the container 211 to a position where picking is to be performed. That is, the automated storage and retrieval system 110 is controlled to rotate a rack 116 storing the container 211 containing the at least one article 201, which is to be picked up at the pick-up area 103 and then eject the container 211 from a take-out opening of the rack 116 to the first conveyor 113, in response to the order information 260 received at the control apparatus 120. The automated storage and retrieval system 110 is controlled to move the container 211 from the first conveyor 113 to the second conveyor 114. The second conveyor 114 is driven independently lane by lane and controlled to bring the container 211 to the position where the picking is to be performed.

In a step corresponding to step S303 of FIG. 13, the controller 121 of the control apparatus 120 controls picking by a manipulator 130, via the communication interface 123. That is, the manipulator 130 is controlled to perform the picking. In the present embodiment, during the picking, the at least one article 201 is picked out of the container 211, which is taken out by the automated storage and retrieval system 110, at a picking area 102, and the picked article 201 is transferred to another container 213.

In a step corresponding to step S304 of FIG. 13, the controller 121 of the control apparatus 120 causes the storage 190 to temporarily store the at least one article 201 picked by the picking, via the communication interface 123. That is, the storage 190 is controlled to temporarily store the at least one article 201 picked by the picking. Specifically, the crane 192 of the storage 190 moves along the aisle faced by the rack 191 of the storage 190 to store the container 213 containing the article 201, which is transferred thereto at the time of the picking. The database 140 holds identification information such as a barcode, a two-dimensional code, or an RFID attached to the container 213, or information indicating the storage position of the container 213 in the storage 190, in association with authentication information 271 such as a claim reference number.

In a step corresponding to step S305 of FIG. 13, an input apparatus 150 of a pick-up terminal 380 accepts an input operation, by the user 220, of authentication information 270 for picking up the at least one article 201. For example, a touch screen of the pick-up terminal 380 accepts an operation in which the user 220 inputs a claim reference number, of which the user 220 has been informed through the network 330 from an e-commerce site or the control apparatus 120. The controller 121 of the control apparatus 120 acquires the authentication information 270 inputted by the input operation accepted at the input apparatus 150, via an input interface 124.

The controller 121 checks the acquired authentication information 270 against the database 140, and then terminates the operations in a case in which the authentication fails. That is, the controller 121 terminates the operations in a case in which valid authentication information 271 identical to the acquired authentication information 270 is not held in the database 140. On the other hand, in a case in which the authentication succeeds, namely, in a case in which valid authentication information 271 identical to the acquired authentication information 270 is held in the database 140, the controller 121 searches the database 140 to identify the container 213, which is associated with the authentication information 271, in a step corresponding to step S306 of FIG. 13. The controller 121 causes the storage 190 to take out the identified container 213 to the pick-up area 103, via the communication interface 123. That is, the storage 190 is controlled to take out the at least one article 201 to the pick-up area 103 in response to the input operation accepted at the input apparatus 150. Specifically, the crane 192 of the storage 190 moves along the aisle faced by the rack 191 of the storage 190 to retrieve the container 213 containing the article 201, and takes out the retrieved container 213 to the pick-up area 103.

The controller 121 of the control apparatus 120 causes, via the communication interface 123, the conveyor 170 to feed the container 213 taken out from the storage 190 into a pick-up box 180 of the pick-up terminal 380. That is, the conveyor 170 is controlled to feed the container 213 taken out from the storage 190 into the pick-up box 180.

Specifically, the controller 121 of the control apparatus 120 moves the container 213 retrieved by the crane 192 of the storage 190 from the crane 192 to the second lane 172 of the conveyor 170. The controller 121 drives the second lane 172 to feed the container 213 into the pick-up box 180 of the pick-up terminal 380. As a method for feeding the container 213, any method may be used. One possible method in the present embodiment includes moving the container 213 from the conveyor 170 into the pick-up box 180 through an opening provided at the rear of the pick-up box 180.

Figure 21:
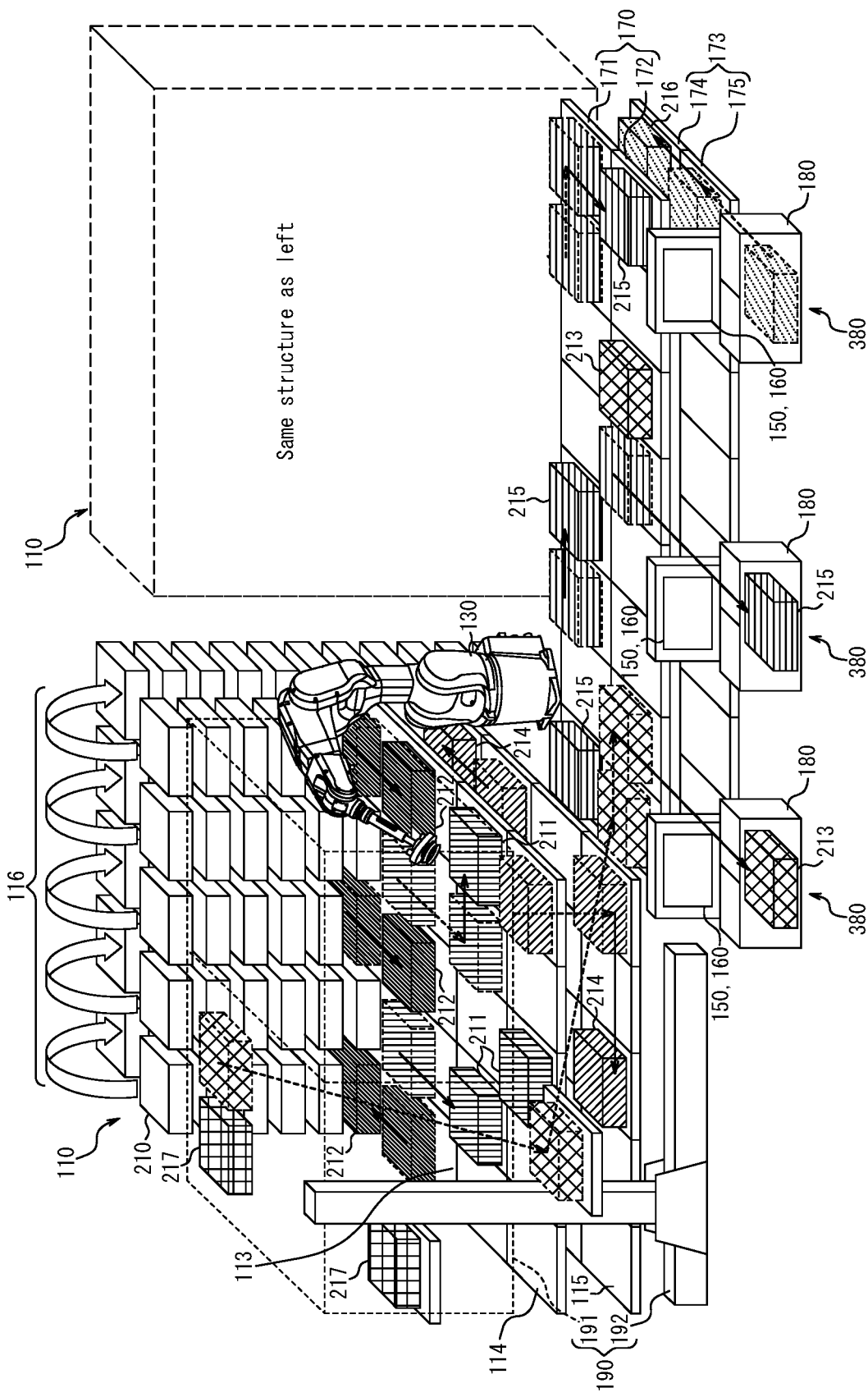
FIG. 21 is a diagram illustrating a partial configuration of an article management system according to a ninth embodiment.

In the example of FIG. 21, the controller 121 of the control apparatus 120 drives the second lane 172 of the conveyor 170 in the right direction to bring the container 213 retrieved by the crane 192 of the storage 190, to a position corresponding to the pick-up terminal 380. The controller 121 drives the second lane 172 in the forward direction to feed the container 213 into the pick-up box 180 of the pick-up terminal 380.

The controller 121 of the control apparatus 120 causes the conveyor 173 to return, to the picking area 102, the container 213 taken out from the storage 190 after the article 201 contained in the container 213 is picked up at the pick-up area 103. That is, the conveyor 173 is controlled to return, to the picking area 102, the container 213 taken out from the storage 190 after the article 201 contained in the container 213 is picked up at the pick-up area 103.

Specifically, the controller 121 of the control apparatus 120 moves the container 213, out of which the at least one article 201 has been picked by the user 220, from the pick-up box 180 to the conveyor 173 as a container 216 for which pick-up is completed. As a method for moving the container 216 to the conveyor 173, any method may be used. One possible method in the present embodiment includes tilting to the rear a plate that is provided in the pick-up box 180 and is adjustable in angle, and sliding the container 216 from the pick-up box 180 to the conveyor 173 through an opening provided at the rear of the pick-up box 180. The controller 121 drives the conveyor 173 to return the container 216 to its original position. The original position is a position where the container 216, which is empty, is held until it is used again as a container 213 for picking.

In the example of FIG. 21, the controller 121 of the control apparatus 120 drives the fourth lane 175 of the conveyor 173 in the rearward direction to move the container 216, which is empty, to the third lane 174 of the conveyor 173. The controller 121 drives the third lane 174 in the left direction to return the container 216 to its original position.

As described above, in the present embodiment, the first lane 171 of the conveyor 170 transports, to a pick-up area 103, at least one article 201 picked by picking in a case in which the article 201 is not temporarily stored in the storage 190. The second lane 172 of the conveyor 170 transports, to the pick-up area 103, the at least one article 201 picked by the picking in a case in which the article 201 is temporarily stored in the storage 190.

Therefore, according to the present embodiment, articles 201 to be picked up immediately after picking and articles 201 to be picked up after being temporarily stored in the storage 190 can be carried to pick-up ports in parallel.

In the present embodiment, the storage 190 is installed closer to the pick-up area 103 than the plurality of racks 116 of the automated storage and retrieval system 110. Thus, the time required to receive products can be reduced.

In the present embodiment, at least a portion of the storage 190 is installed above the second conveyor 114. Thus, available space can be utilized effectively.

In the present embodiment, the storage 190 stores containers 213 separately in two or more compartments having temperature settings different from each other, according to the type of an article 201 contained in each container 213, in the same manner as the automated storage and retrieval system 110. For example, one or more racks 191 are as a whole divided into four compartments corresponding to four respective temperature ranges, which are frozen, chilled, constant, and ambient, and the containers 213 are stored separately in the four compartments according to the type of an article 200 contained in each container 213. Since the storage 190 is independent of the automated storage and retrieval system 110, frequent opening and closing thereof is not necessary, making it easier to manage the temperature ranges.

In the present embodiment, the storage 190 can also store an article deposited by a user 220, such as a package. The controller 121 of the control apparatus 120 drives the second lane 172 in the opposite direction from when transporting at least one article 201 to the pick-up area 103, to transport the article deposited by the user 220 to the storage 190. That is, the second lane 172 is driven in the opposite direction from when transporting the at least one article 201 to the pick-up area 103 and controlled to transport the article deposited by the user 220 to the storage 190. In the example of FIG. 21, the controller 121 moves a container 217 containing the article deposited by the user 220 from a pick-up box 180 to the conveyor 173. The controller 121 drives the conveyor 173 in the left direction to transport the container 217 to the storage 190. The storage 190 stores the container 217. The article deposited by the user 220 may be picked up by the user 220 using the same procedure as that for articles 201 that are ordered by users 220 and temporarily stored in the storage 190.

The difference between the example of FIG. 20 and the example of FIG. 21 is that the storage 190 for pre-orders is present in the example of FIG. 21. In the example of FIG. 21, a container 213 containing at least one article 201 picked in advance by picking is stored in the storage 190. In a case in which a user 220 comes to pick up the article 201, the article 201 is transported directly from the storage 190 to a pick-up terminal 380 without going through a picking area 102.

As a variation of the present embodiment, a temperature range management function may be added to each container 213. For example, among four temperature ranges, which are frozen, chilled, constant, and ambient, the corresponding temperature range may differ for each container 213. According to this variation, the temperature ranges can be managed more reliably.

As a variation of the present embodiment, a dedicated pick-up box may be installed into which a container 213 taken out from the storage 190 is directly fed without going through the conveyor 170.

As a variation of the present embodiment, after a pre-order from a terminal device of a user 220 such as a smartphone, the position of the terminal device may be confirmed, the time of arrival of the user 220 may be predicted, and an article 201 to be picked up by the user 220 may be prepared at an earlier preparation time calculated backwards from the time of the arrival.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

The invention claimed is:

1. An article management system comprising:
    an automated storage and retrieval system configured to store a plurality of containers, each container containing one or more articles, and take out, to a picking area adjacent to a pick-up area, a container containing at least one article to be picked up at the pick-up area, among the plurality of containers;
    a control apparatus configured to control or support picking, at the picking area, the at least one article out of the container taken out by the automated storage and retrieval system;
    a conveyor configured to transport, to the pick-up area, the at least one article picked by the picking; and
    a storage configured to temporarily store the at least one article picked by the picking,
    wherein the conveyor has a first lane configured to transport, to the pick-up area, the at least one article picked by the picking in a case in which the at least one article is not temporarily stored in the storage, and a second lane configured to transport, to the pick-up area, the at least one article picked by the picking in a case in which the at least one article is temporarily stored in the storage.

2. The article management system according to claim 1, further comprising a manipulator configured to perform the picking,
    wherein the control apparatus is configured to control the picking by the manipulator.

3. The article management system according to claim 1, wherein
    the control apparatus is configured to receive order information for the at least one article transmitted through a network, and
    the automated storage and retrieval system is configured to take out the container containing the at least one article to the picking area in response to the order information received at the control apparatus,
    the article management system further comprising:
    an input apparatus configured to accept an input operation, by a user, of authentication information for picking up the at least one article; and
    a storage configured to temporarily store the at least one article picked by the picking, and take out the at least one article to the pick-up area in response to the input operation accepted at the input apparatus.

4. The article management system according to claim 1, further comprising an input apparatus configured to accept an input operation, by a user, of authentication information for picking up the at least one article,
    wherein the automated storage and retrieval system is configured to take out the container containing the at least one article to the picking area in response to the input operation accepted at the input apparatus.

5. The article management system according to claim 4, further comprising a database configured to hold valid authentication information for each article contained in the plurality of containers,
    wherein the control apparatus is configured to check the authentication information inputted by the input operation against the database to identify the container containing the at least one article, and cause the automated storage and retrieval system to take out the identified container to the picking area.

6. The article management system according to claim 4, configured to be installed in a courier's delivery location.

7. The article management system according to claim 1, configured to be installed in any one facility of a petrol station, a railway station, a compound, an office building, and an apartment building.

8. The article management system according to claim 1, further comprising a pick-up box configured to be used by a user to pick up, at the pick-up area, the at least one article picked by the picking.

9. The article management system according to claim 1, further comprising a storage configured to temporarily store the at least one article picked by the picking,
wherein
the automated storage and retrieval system is configured to take out the container containing the at least one article to the picking area in response to order information for the at least one article transmitted through a network, and
the storage is configured to take out the at least one article to the pick-up area in response to an input operation, by a user, of authentication information for picking up the at least one article.

10. The article management system according to claim 9, wherein
the automated storage and retrieval system comprises a conveyor configured to bring the container containing the at least one article to a position where the picking is to be performed, and
at least part of the storage is installed above or below the conveyor.

11. The article management system according to claim 1, wherein the picking places, in another container, the at least one article picked out of the container taken out by the automated storage and retrieval system,
the article management system further comprising another conveyor installed below or above the conveyor and configured to return, after the at least one article is picked up at the pick-up area, the container in which the at least one article has been placed by the picking, to the picking area.

12. The article management system according to claim 1, wherein
the second lane is configured to be driven in an opposite direction from when transporting the at least one article to the pick-up area, to transport an article deposited by a user to the storage, and
the storage is configured to store the article deposited by the user.

13. An article management system comprising:
an automated storage and retrieval system configured to store a plurality of containers, each container containing one or more articles, and take out, to a picking area adjacent to a pick-up area, a container containing at least one article to be picked up at the pick-up area, among the plurality of containers;
a control apparatus configured to control or support picking, at the picking area, the at least one article out of the container taken out by the automated storage and retrieval system; and
an input apparatus configured to accept an order operation for the at least one article by a user,
wherein
the automated storage and retrieval system is configured to take out the container containing the at least one article to the picking area in response to the order operation accepted at the input apparatus,
the automated storage and retrieval system comprises a rack configured to store the plurality of containers, and a crane configured to move along an aisle faced by the rack to retrieve the container containing the at least one article and take out the retrieved container to the picking area, and
the control apparatus is configured to predict an article to be ordered by the order operation before the order operation is completed, and cause the crane to move according to a storage position, in the rack, of a container containing the predicted article among the plurality of containers.

14. A logistics system comprising:
the article management system according to claim 1; and
a mobile robot configured to deliver, to the article management system, an article brought into the automated storage and retrieval system.

15. A logistics system comprising:
the article management system according to claim 1; and
a drone configured to deliver, to the article management system, an article brought into the automated storage and retrieval system.

16. A server device to be connected with an article management system including:
an automated storage and retrieval system configured to store a plurality of containers, each container containing one or more articles, and take out, to a picking area adjacent to a pick-up area, a container containing at least one article to be picked up at the pick-up area, among the plurality of containers; and
a control apparatus configured to control or support picking, at the picking area, the at least one article out of the container taken out by the automated storage and retrieval system,
the server device comprising:
a communication interface configured to communicate with a user's terminal device; and
a controller configured to accept a designation or a pre-order for the at least one article via the communication interface, select, from among a plurality of locations, a location where the container containing the at least one article is stored in the automated storage and retrieval system, with reference to inventory information for the article management system, which is installed in each location of the plurality of locations, and inform the terminal device of the selected location via the communication interface.

17. The server device according to claim 16, wherein the controller is configured to detect a position of the user via the communication interface, and in a case in which the plurality of locations includes two or more locations where the container containing the at least one article is stored in the automated storage and retrieval system, select a location, of which the terminal device is to be informed, from among the two or more locations according to distances between the detected position and the two or more locations.

* * * * *